US012498722B2

(12) United States Patent
Kawahata

(10) Patent No.: US 12,498,722 B2
(45) Date of Patent: *Dec. 16, 2025

(54) TURNING CONTROL FOR AUTONOMOUS AGRICULTURAL VEHICLE

(71) Applicant: KUBOTA CORPORATION, Osaka (JP)

(72) Inventor: Shotaro Kawahata, Fremont, CA (US)

(73) Assignee: KUBOTA CORPORATION, Osaka (JP)

( * ) Notice: Subject to any disclaimer, the term of this patent is extended or adjusted under 35 U.S.C. 154(b) by 194 days.

This patent is subject to a terminal disclaimer.

(21) Appl. No.: 18/229,233

(22) Filed: Aug. 2, 2023

(65) Prior Publication Data

US 2025/0044797 A1  Feb. 6, 2025

(51) Int. Cl.
*G01C 21/20* (2006.01)
*G05D 1/00* (2006.01)
*G05D 1/648* (2024.01)

(52) U.S. Cl.
CPC ......... *G05D 1/0212* (2013.01); *G05D 1/0088* (2013.01); *G05D 1/0238* (2013.01)

(58) Field of Classification Search
CPC ... G05D 1/0212; G05D 1/0088; G05D 1/0238
See application file for complete search history.

(56) References Cited

U.S. PATENT DOCUMENTS 9,880,560 B2 *  1/2018  Han ................... B60D 1/36
10,266,201 B2 *  4/2019  Dang ................. B62D 6/002
2017/0168501 A1 *  6/2017  Ogura ............... G05D 1/6484
2021/0339768 A1  11/2021  Kakkar et al.
2022/0187823 A1 *  6/2022  Ramasamy ......... B60W 30/09
2022/0412018 A1  12/2022  Doy
2023/0015153 A1  1/2023  Morimoto et al.

(Continued)

FOREIGN PATENT DOCUMENTS

EP  3170381 A1  5/2017
WO  2023127556 A1  7/2023

OTHER PUBLICATIONS

Kawahata, "Turning Control for Autonomous Agricultural Vehicle", U.S. Appl. No. 18/229,235, filed Aug. 2, 2023.

(Continued)

*Primary Examiner* — Scott A Browne
*Assistant Examiner* — Izcalli Rios-Aguirre
(74) *Attorney, Agent, or Firm* — Keating & Bennett, LLP

(57) ABSTRACT

An autonomous vehicle navigation system includes a controller configured or programmed to receive information of a work vehicle, receive data input from a user, and cause the work vehicle to traverse a first plot, exit the first plot; traverse a margin area located between the first plot and an adjacent area or a second plot, and perform a turning maneuver process before entering a second row in the first plot. When the work vehicle performs the turning maneuver, the controller allows at least a portion of the work vehicle to reverse into the adjacent area or a third row included in the second plot based on the controller judging whether or not at least one or more conditions is satisfied, the one or more conditions being based on data detected from at least one sensor and/or the input data from the user.

20 Claims, 25 Drawing Sheets

(56) References Cited

U.S. PATENT DOCUMENTS

2023/0384794 A1\* 11/2023 Brossard .............. G05D 1/0088
2024/0337753 A1   10/2024 Fujiwara et al.

OTHER PUBLICATIONS

Official Communication issued in corresponding European Patent Application No. 24172216.4, mailed on Feb. 11, 2025, 7 pages.
Official Communication issued in corresponding European Patent Application No. 24172216.4 mailed on Oct. 25, 2024, 9 pages.

\* cited by examiner

FIG. 3A

Details of Judging Point 1

| | Item | Enter Trellises: YES | Enter Trellises: NO |
|---|---|---|---|
| Available Info before Driving | User select function ON/OFF | ON | OFF |
| | Type of Implement | without tire | with tire |
| | Type of Implement (length) | $L < A$ OR $W_A < L + A$ | $A \leq L$ AND $L+A \leq W_A$ |
| | Type of Implement (center line) | $CL = TCL$ | $CL \neq TCL$ |
| | Trellis in the adjacent area | YES | NO |
| | Adjacent area is field | YES | NO |
| | Trellis row width vs. Tractor+Implement width | $A1 < W1$ | $A1 \geq W1$ |
| | Slope of the adjacent field | Slope [%] < [NA] | Slope [%] ≥ [NA] |
| | Work plan in adjacent field | NO work on adjacent fields at the same time | Work on adjacent fields at the same time |

FIG. 3B

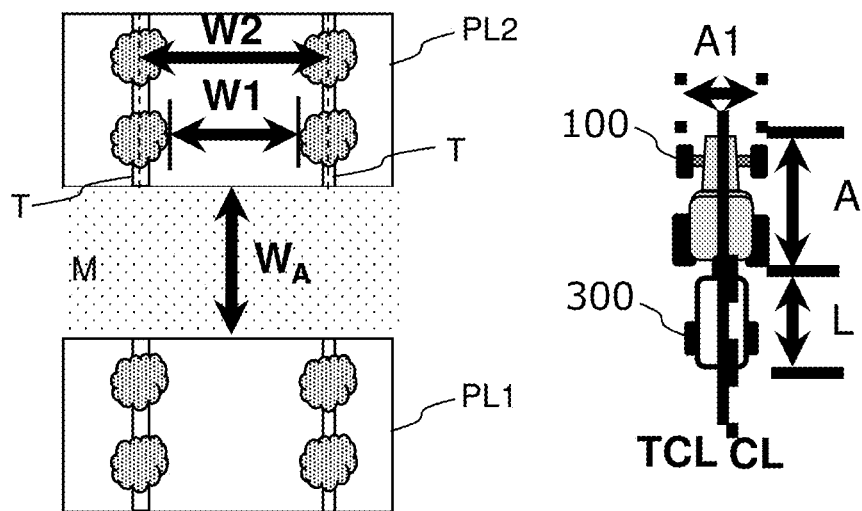

FIG. 4A

Details of Judging Point 2

| | Item | Enter Trellises: YES | Enter Trellises: NO |
|---|---|---|---|
| Real-time Info after Driving | Trellis type | I type vineyard training | Y type vineyard training |
| | Inflation Layer Value | Inflation Layer ≤ [NA] | Inflation Layer > [NA] |
| | Trellis row width vs. Tractor+Implement width | A1 < [W1 – (Inf × 2)] | [W1 – (Inf × 2)] ≤ A1 |
| | Number of reverses | (N2 ≤ α) AND (N2 – N1 > 1) | (N2 > α) OR (N2 – N1 ≤ 1) |
| | Slope of the adjacent field | Slope [%] < [NA] | Slope [%] ≥ [NA] |
| | Trellis row direction | T1 – T2 ≤ [NA] | T1 – T2 > [NA] |
| | Turning place (Center or Edge of the field) | Center of the field | Edge of the field |
| | Obstacles in the trellis | NO | YES |

N1 : Number of reverses required when turning with trellis
N2 : Number of reverses required when turning without trellis
α : Number of reverses set by the user

FIG. 4B

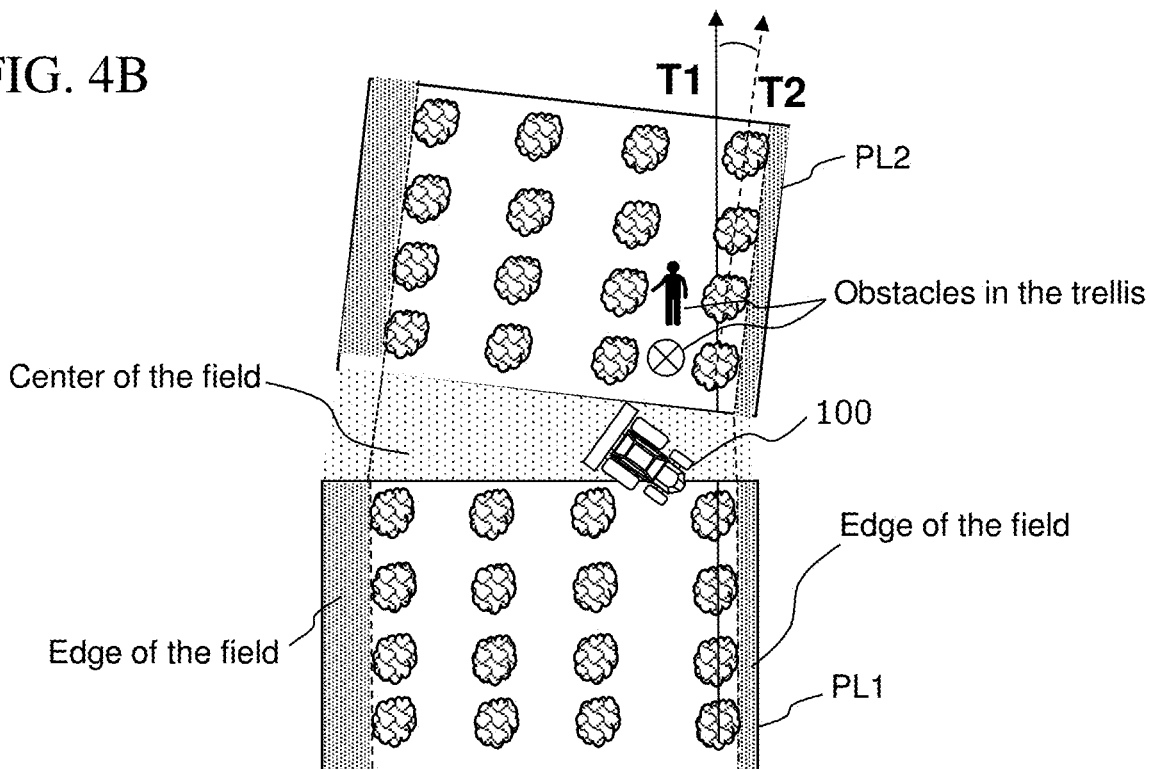

(Before turning)

(During turning)

FIG. 13A
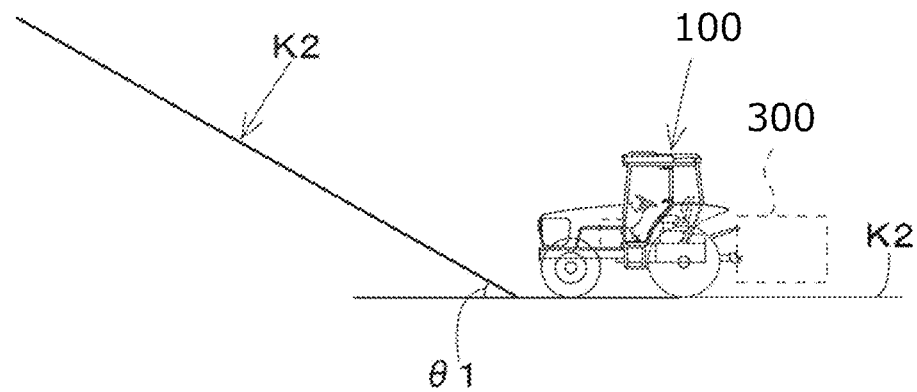
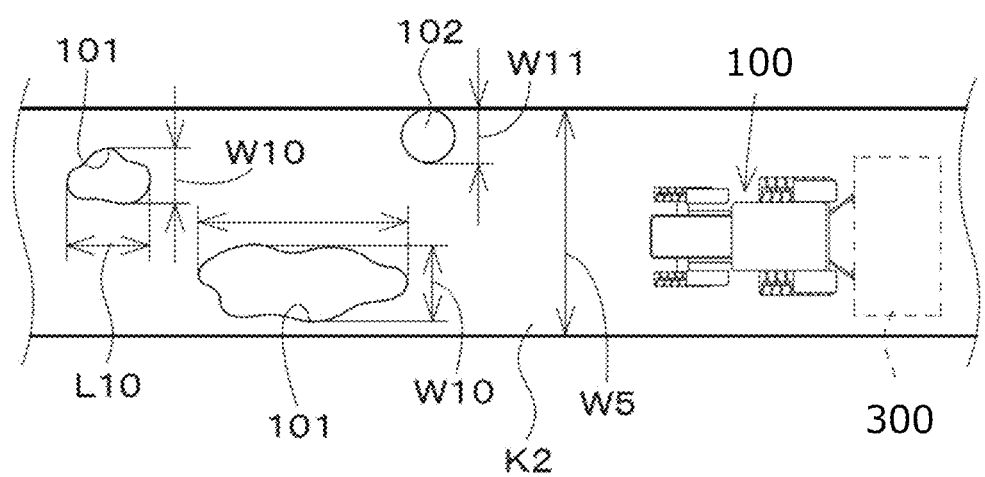
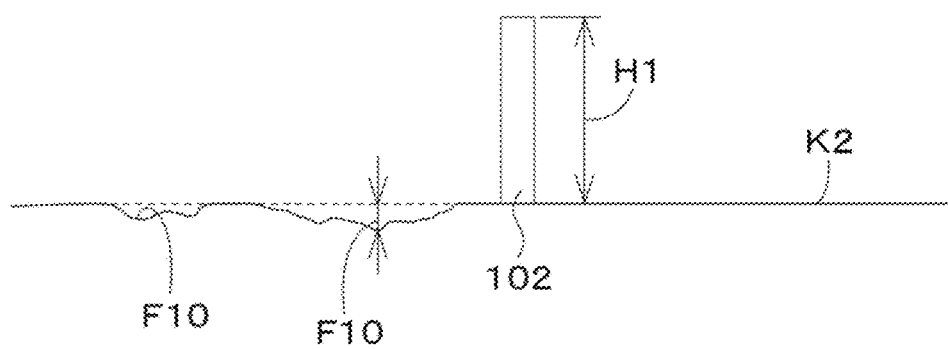

FIG. 14A
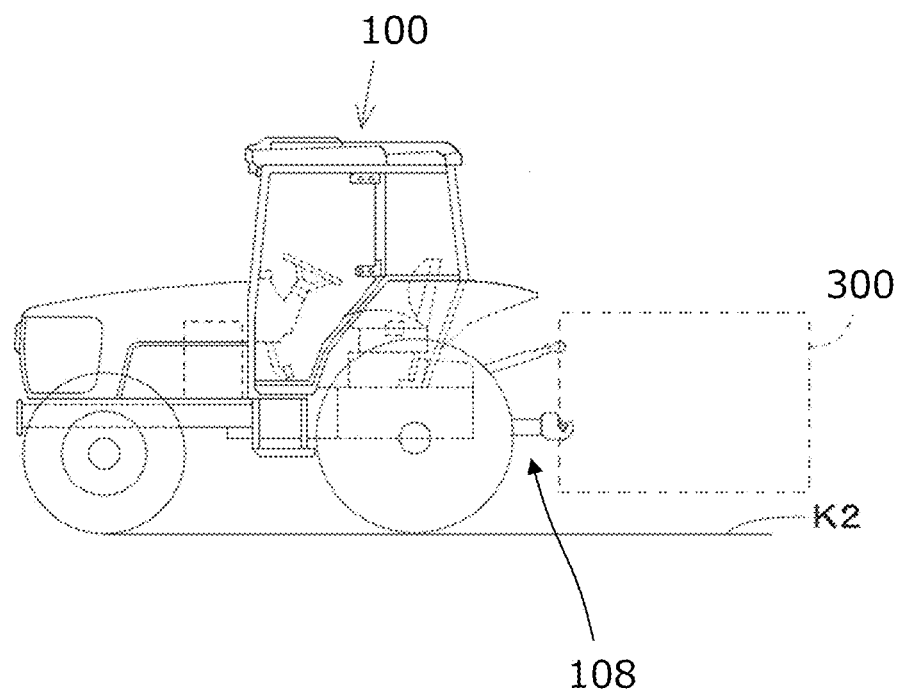
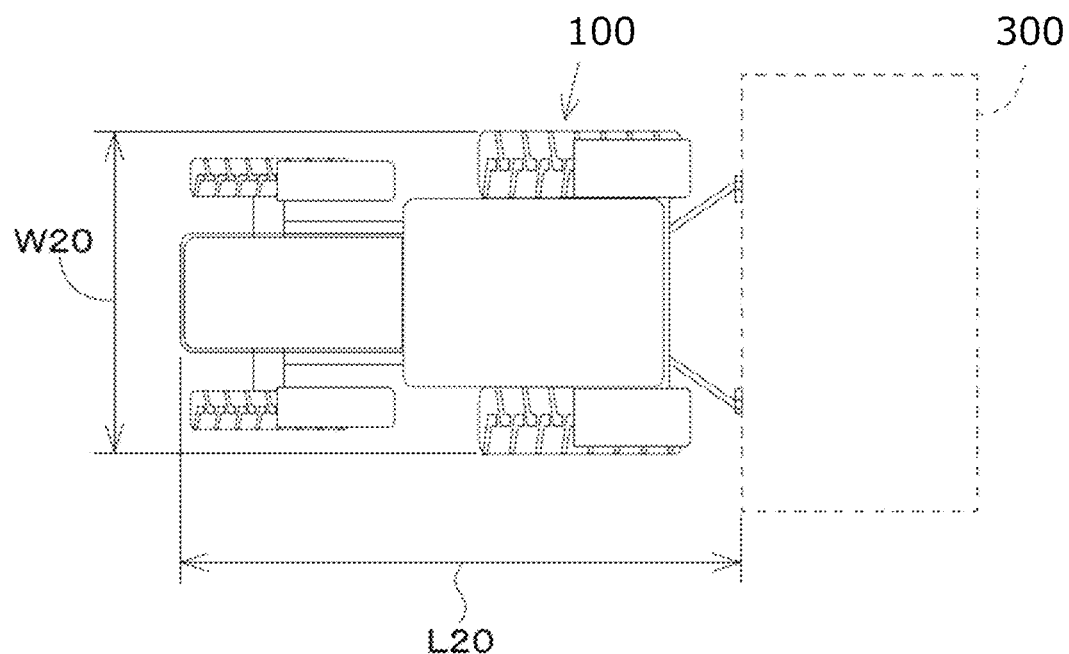

FIG. 14B
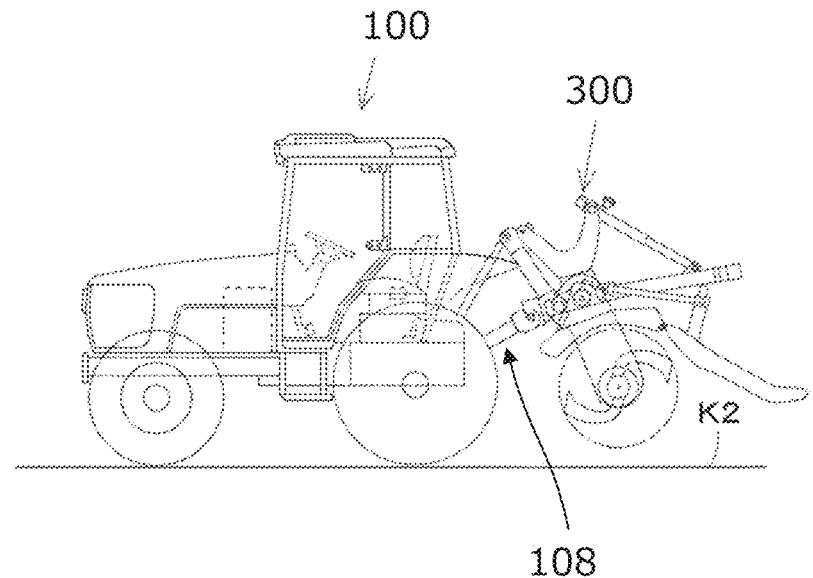
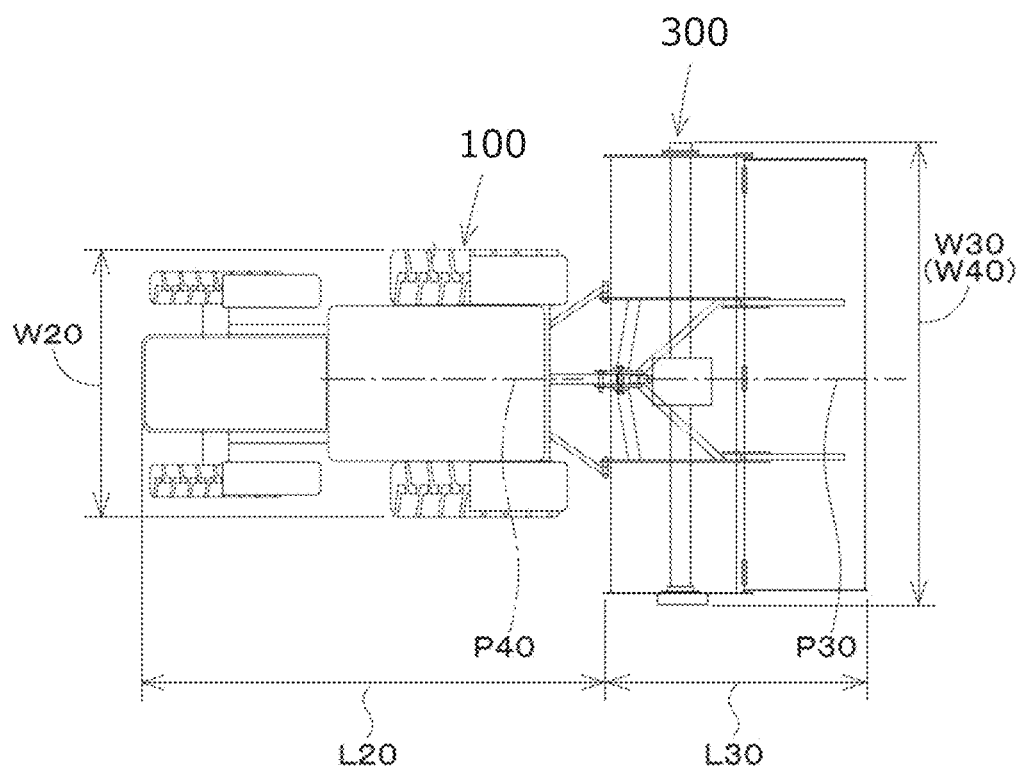

FIG. 14C
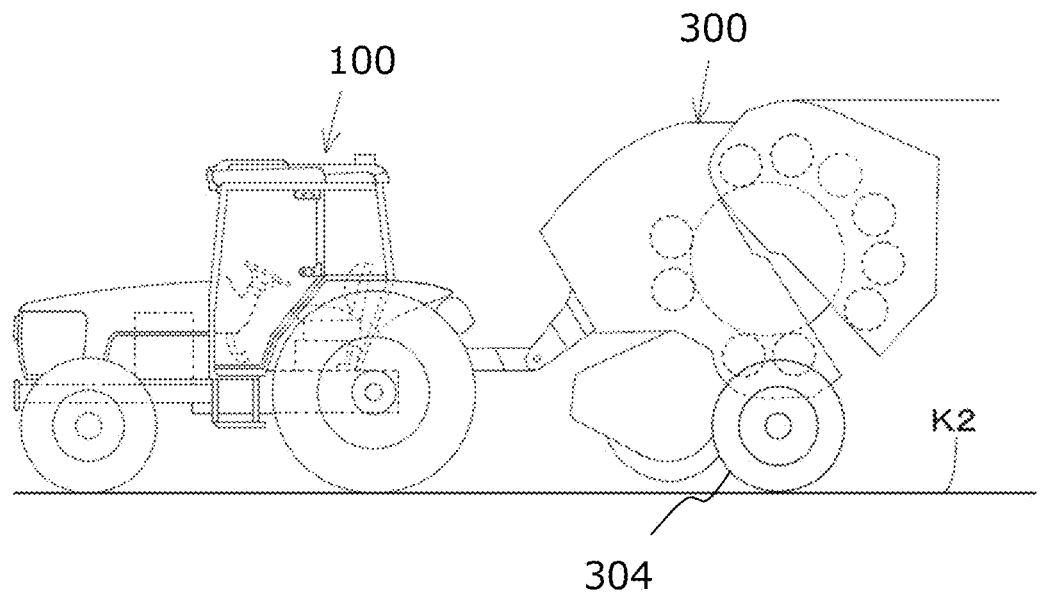
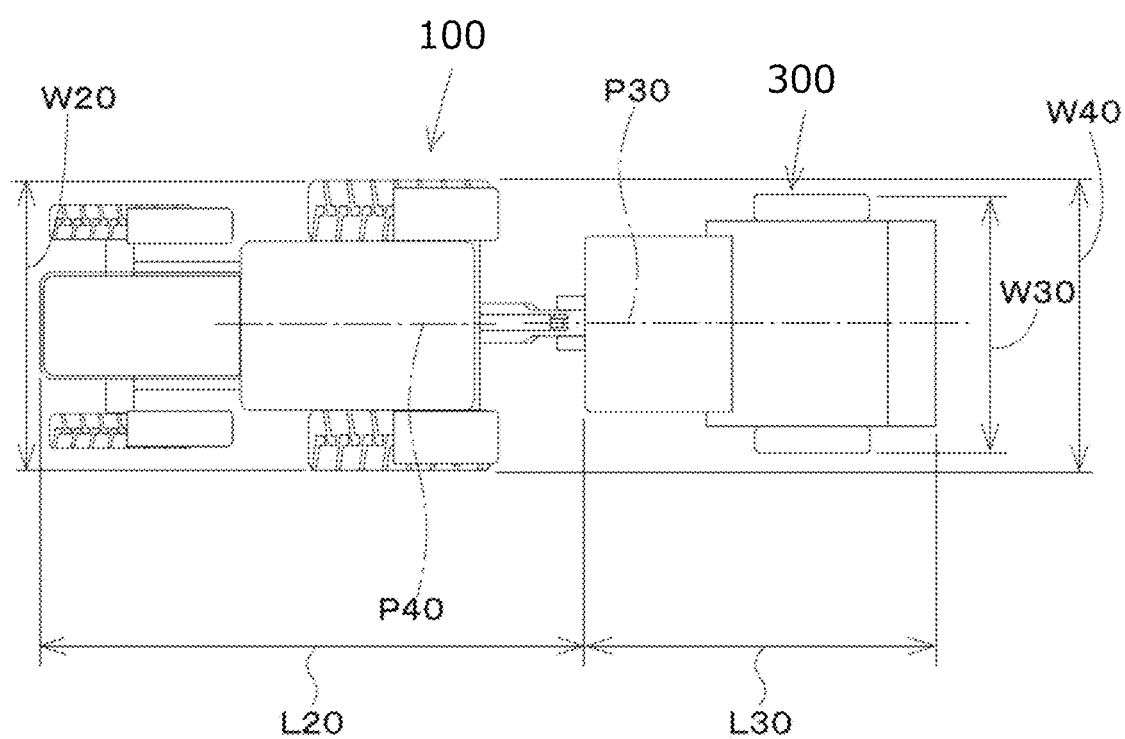

FIG. 15

| Input Screen | | |
|---|---|---|
| Turning Area Wider Function | ON | OFF |
| Type of Implement Length | Without Tire | With Tires |
| Tractor Length | | |
| Implement Length | | |
| Offset width | | |
| Avenue Width | | |
| Implement Center Line | | |
| Work Plan Schedule | | |
| | CANCEL | OK |

I-Type Training

Y-Type Training

TURNING CONTROL FOR AUTONOMOUS AGRICULTURAL VEHICLE

BACKGROUND OF THE INVENTION

1. Field of the Invention

The present invention relates to systems and methods of turning control for an autonomous agricultural work vehicle, such as a tractor, when turning into a row between trellises.

2. Description of the Related Art

Research and development have been directed to the automation of agricultural machines to be used in fields. For example, work vehicles, such as tractors, combines, and rice transplanters, which automatically travel within fields by utilizing a positioning system, e.g., a GNSS (Global Navigation Satellite System), are coming into practical use.

U.S. Patent application Pub. No. 2023/0015153 A1 discloses agricultural machines that perform autonomous travel in accordance with a planned travel line. The planned travel line may include a straight movement portion to cause the vehicle body to move straight and a turning portion to cause the vehicle body to turn. An autonomous travel controller is configured to perform line alignment by controlling traveling and steering of the vehicle body. In the line alignment, the autonomous travel controller is configured to perform a K-turn by moving the vehicle body forward and then moving the vehicle body backward. In the line alignment, the autonomous travel controller may be configured or programmed to perform the K-turn a plurality of times and start the autonomous travel if the number of times that the K-turn is performed becomes greater than or equal to a predetermined number of times.

However, in situations where space of the travel path is restricted or limited when the vehicle is turning into the rows of trellises, especially with an implement or working tool attached to the vehicle or tractor, it may be required for the vehicle to perform multiple turning movements or reverse multiple times in order to travel into between the rows of trellises. Thus, there is a need for an autonomous tractor system that is capable of defining boundaries of areas during turning control, and judging whether or not the vehicle is allowed to utilize certain areas during a turning maneuver when turning into a space or row between trellises.

SUMMARY OF THE INVENTION

Preferred embodiments of the present invention provide novel techniques, systems, and methods of turning control for an autonomous agricultural vehicle when turning into a row between trellises, and defining boundaries of areas during turning control.

According to a preferred embodiment of the present invention, an autonomous vehicle navigation system for a work vehicle capable of self-driving, the system comprising a controller configured or programmed to receive information that is regarding a location of the work vehicle or an environment of the work vehicle and is detected by at least one sensor, and receive input data entered at a terminal device from a user. The controller is configured or programmed to cause the work vehicle to traverse a first plot including a plurality of rows, exit the first plot from a first row included in the plurality of rows of the first plot, traverse a margin area located between the first plot and an adjacent area or a second plot that includes a plurality of rows, the adjacent area or the second plot being spaced away from the first plot with the margin area located between the first plot and the adjacent area or the second plot, and perform a turning maneuver process before entering a second row in the plurality of rows of the first plot. When the work vehicle performs the turning maneuver process, the controller is configured or programmed to allow at least a portion of the work vehicle to reverse into the adjacent area or a third row included in the plurality of rows of the second plot based on the controller judging whether or not at least one or more conditions is satisfied, the one or more conditions being based on the data detected from the at least one sensor and/or the input data entered at the terminal device from the user.

According to a preferred embodiment of the present invention, if the controller judges that at least one of the conditions is not satisfied, the controller is configured or programmed to set a geofence between the margin area and the adjacent area or the second plot.

According to a preferred embodiment of the present invention, the input data entered at the terminal device from the user includes a user select function being set to ON or OFF, and the at least one or more conditions for the work vehicle being allowed to reverse into the third row is based on the user select function.

According to a preferred embodiment of the present invention, the input data entered at the terminal device from the user includes an indication of whether or not an implement attached to the work vehicle includes one or more tires, and the at least one or more conditions for the work vehicle being allowed to reverse into the third row is based on the indication of whether or not the implement attached to the work vehicle includes one or more tires. If the implement includes one or more tires, then the work vehicle is not allowed to reverse into the third row, and if the implement does not include one or more tires, then the work vehicle is allowed to reverse into the third row.

According to a preferred embodiment of the present invention, the input data entered at the terminal device from the user includes a length (A) of the work vehicle, a length (L) of an implement attached to the work vehicle, and a width (WA) of the margin area, and the at least one or more conditions for the work vehicle being allowed to reverse into the third row is based on A, L, and WA such that the work vehicle is allowed to reverse into the third row if either one of the following conditions are satisfied: $L<A$ or $WA<L+A$.

According to a preferred embodiment of the present invention, the input data entered at the terminal device from the user includes CL which defines a position of a center line of an implement that is attached to the work vehicle, TCL which defines a position of a center line of the work vehicle, and the at least one or more conditions for the work vehicle being allowed to reverse into the third row is based on CL and TCL such that the work vehicle is allowed to reverse into the third row if CL is equal or substantially equal to TCL.

According to a preferred embodiment of the present invention, the input data entered at the terminal device from the user includes an indication of whether or not a trellis is present in the second plot or the adjacent area, and the work vehicle is allowed to reverse into the third row if the trellis is present in the second plot or the adjacent area.

According to a preferred embodiment of the present invention, the input data entered at the terminal device from the user includes an indication of whether or not the adjacent area is a field, and the work vehicle is allowed to reverse into the third row if the adjacent area is a field.

According to a preferred embodiment of the present invention, the input data entered at the terminal device from the user includes W1 which defines a trellis row width, and A1 which defines a total width of the work vehicle and an implement attached to the work vehicle. The work vehicle is allowed to reverse into the third row if A1 is less than W1.

According to a preferred embodiment of the present invention, the input data entered at the terminal device from the user or the information detected by the at least one sensor includes a slope of the second plot or the adjacent field, and the work vehicle is allowed to reverse into the third row of the second plot or the adjacent field if the slope is less than a preselected value.

According to a preferred embodiment of the present invention, the input data entered at the terminal device from the user includes an indication of whether or not a work plan is occurring in the second plot or the adjacent field, and the work vehicle is allowed to reverse into the third row of the second plot or the adjacent field if there is no work plan occurring in the second plot or the adjacent field.

According to a preferred embodiment of the present invention, the information detected by the at least one sensor includes an indication of a trellis type of a trellis in the second plot being I-type vineyard training or Y-type vineyard training, and the work vehicle is allowed to reverse into the third row of the second plot if the trellis type is I-type vineyard training. The work vehicle is not allowed to reverse into the third row of the second plot if the trellis type is Y-type vineyard training.

According to a preferred embodiment of the present invention, the information detected by the at least one sensor includes an inflation layer value, and the work vehicle is allowed to reverse into the third row of the second plot if the inflation layer value is less than or equal to a predetermined value.

According to a preferred embodiment of the present invention, the input data entered at the terminal device from the user includes W1 which defines a trellis row width, and A1 which defines a total width of the work vehicle and an implement attached to the work vehicle. The information detected by the at least one sensor includes an inflation layer value (Inf), and the work vehicle is allowed to reverse into the third row of the second plot if $A1<W1-(Inf\times 2)$.

According to a preferred embodiment of the present invention, the controller is configured or programmed to determine N1 which is a number of reverses required if the work vehicle performs the turning maneuver process using the adjacent area or the third row, and N2 which is a number of reverses required when the work vehicle performs the turning maneuver process without using the adjacent area or the third row. The input data entered at the terminal device from the user includes a which is a number of reverses set by the user. The work vehicle is allowed to reverse into the third row of the second plot if $N2 \leq \alpha$ and $N2-N1>1$ is satisfied.

According to a preferred embodiment of the present invention, the information detected by the at least one sensor includes T1 which is a trellis row direction of a trellis of the second row, and T2 which is a trellis row direction of a trellis of the third row. The work vehicle is allowed to reverse into the third row of the second plot if an angle between T1 and T2 is less than or equal to a predetermined value.

According to a preferred embodiment of the present invention, the first plot, the margin area, and the second plot are included in a field, the information detected by the at least one sensor includes a location of the work vehicle with respect to a center of the field and an edge of the field, boundaries between the center of the field and the edges of the field extending along outer edge of outermost rows of the first plot, and the work vehicle is allowed to reverse into the third row of the second plot if the work vehicle is located in the center of the field.

According to a preferred embodiment of the present invention, the information detected by the at least one sensor includes an indication of whether or not there is an obstacle detected in the third row, and the work vehicle is allowed to reverse into the third row if there is no obstacle detected in the third row.

In accordance with another preferred embodiment of the present invention, a method being performed by a controller of autonomous vehicle navigation for a work vehicle capable of self-driving includes steps of receiving information that is regarding a location of the work vehicle or an environment of the work vehicle and is detected by at least one sensor, and receiving input data entered at a terminal device from a user. The controller causes the work vehicle to traverse a first plot including a plurality of rows, exit the first plot from a first row included in the plurality of rows of the first plot, traverse a margin area located between the first plot and an adjacent area or a second plot that includes a plurality of rows, the adjacent area or the second plot being spaced away from the first plot with the margin area located between the first plot and the adjacent area or the second plot, and perform a turning maneuver process before entering a second row in the plurality of rows of the first plot. When the work vehicle performs the turning maneuver process, the controller is configured or programmed to allow at least a portion of the work vehicle to reverse into the adjacent area or a third row included in the plurality of rows of the second plot based on the controller judging whether or not at least one or more conditions is satisfied, the one or more conditions being based on the information obtained from the at least one sensor and/or the input data entered at the terminal device from the user.

According to a preferred embodiment of the present invention, the method further includes the step of setting a geofence between the margin area and the adjacent area or the second plot if the controller judges that at least one of the conditions of the first condition group or the condition second group is not satisfied.

According to preferred embodiments of the present disclosure, it is possible to provide systems and methods of efficient turning control for an autonomous vehicle when turning into a row between trellises.

The above and other features, elements, steps, configurations, characteristics, and advantages of the present invention will become more apparent from the following detailed description of preferred embodiments of the present invention with reference to the attached drawings.

BRIEF DESCRIPTION OF THE DRAWINGS

FIG. 3A shows conditions of Judging Point 1.

FIG. 3B shows parameters used for conditions of Judging Point 1 and/or Judging Point 2.

FIG. 4A shows conditions of Judging Point 2.

FIG. 4B shows parameters used for conditions of Judging Point 1 and/or Judging Point 2.

FIG. 13A illustrates examples of field or trellis row conditions.

FIG. 14A illustrates an example of an implement without wheels connected to a work vehicle.

FIG. 14B illustrates another example of an implement without wheels connected to a work vehicle.

FIG. 14C illustrates an example of an implement with wheels connected to a work vehicle.

FIG. 15 illustrates an example of an input screen at a user terminal to input user input data before driving.

DETAILED DESCRIPTION OF PREFERRED EMBODIMENTS

Figure 1A:
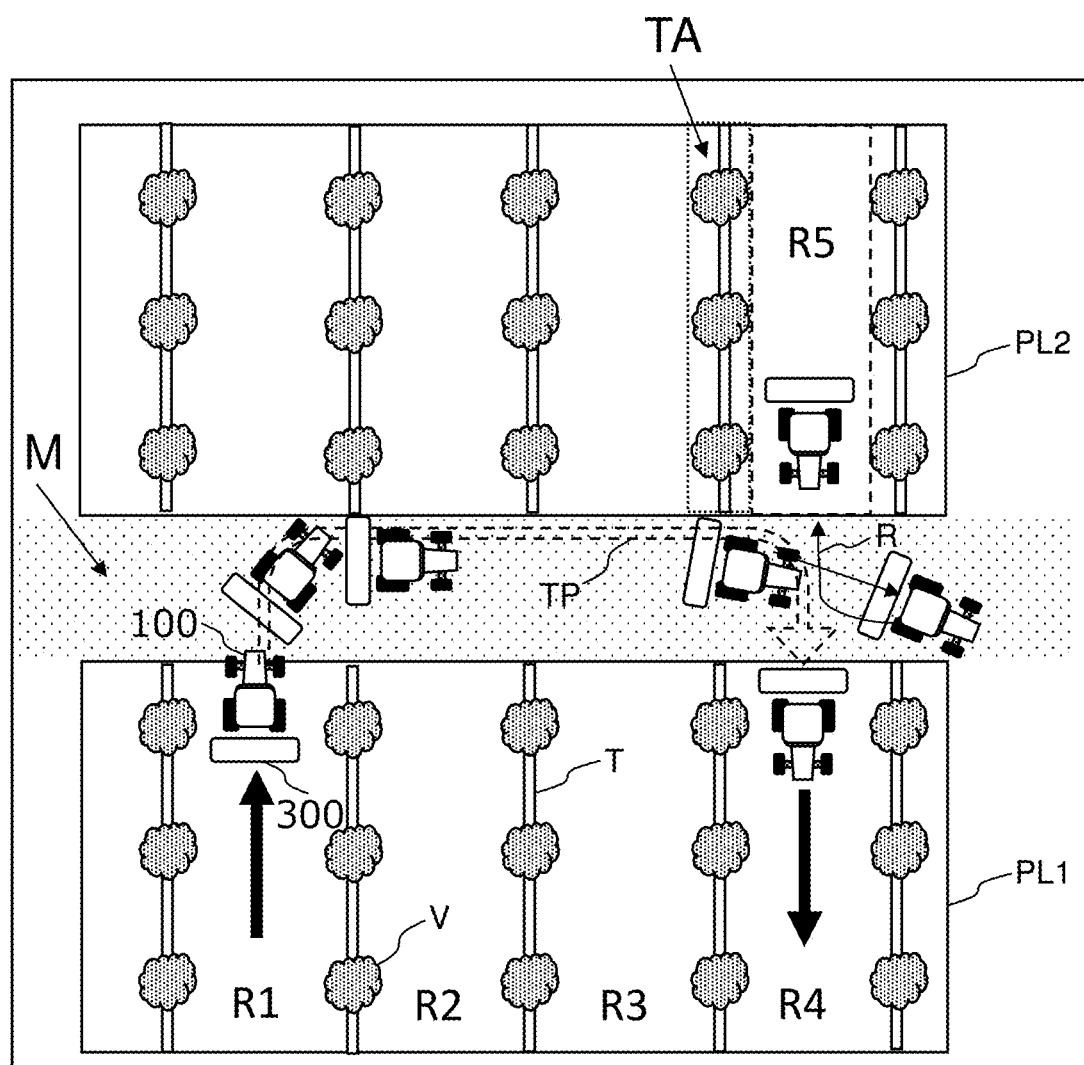
FIG. 1A shows a turning path route of an autonomous agricultural vehicle utilizing an opposite side trellis.

Hereinafter, preferred embodiments of the present disclosure will be described more specifically. Note however that unnecessarily detailed descriptions may be omitted. For example, detailed descriptions on what is well known in the art or redundant descriptions on what is substantially the same configuration may be omitted. This is to avoid lengthy description, and facilitate the understanding of those skilled in the art. The accompanying drawings and the following description, which is provided so that those skilled in the art can sufficiently understand the present disclosure, are not intended to limit the scope of claims. In the following description, component elements having identical or similar functions are denoted by identical reference numerals.

The following preferred embodiments are only exemplary, and the techniques according to the present disclosure is not limited to the following preferred embodiments. For example, numerical values, shapes, materials, steps, and orders of steps, layout of a display screen, etc., that are indicated in the following preferred embodiments are only exemplary, and admit of various modifications so long as it makes technological sense. Any one implementation may be combined with another so long as it makes technological sense to do so.

Preferred embodiments of the present invention provide systems and methods for turning control that can be used by autonomous vehicles to perform various predetermined tasks. The various tasks can include, for example, agricultural operations, environment imaging operations, hauling operations, etc.

The autonomous vehicles used together with preferred embodiments of the present invention are preferably tractors or other agricultural vehicles, but any desirable type of autonomous vehicle would work with preferred embodiments of the present invention.

In the present disclosure, an "agricultural vehicle," "agricultural machine," or "work vehicle" means a vehicle or machine for agricultural or farming applications. Examples of such machines or vehicles include tractors, harvesters, rice transplanters, vehicles for crop management, vegetable transplanters, mowers, seeders, spreaders, and mobile robots for agriculture. Not only may a work vehicle (such as a tractor) function as an "agricultural machine" alone by itself, but also an implement that is attached to or towed by a work vehicle may together in combination with the work vehicle function as an "agricultural machine". For the ground surface within a field, an agricultural machine performs agricultural work such as tilling, seeding, preventive pest control, manure spreading, planting of crops, or harvesting.

As used herein, "self-driving" means controlling the movement of an agricultural machine by the action of a controller, rather than through manual operations of a driver. An agricultural machine that performs self-driving may be referred to as a "self-driving agricultural machine" or a "robotic agricultural machine". During self-driving, not only the movement of the agricultural machine, but also the operation of agricultural work may also be controlled automatically. In the case where the agricultural machine is a vehicle-type machine, traveling of the agricultural machine or vehicle via self-driving will be referred to as "self-traveling". The controller may control at least one of: steering that is required in the movement of the agricultural machine, adjustment of the moving speed, and beginning and ending a move. In the case of controlling a work vehicle having an implement attached thereto, the controller may control raising or lowering of the implement, beginning and ending of an operation of the implement, and so on. A move based on self-driving may include not only moving of an agricultural machine that goes along a predetermined path toward a destination, but also moving of an agricultural machine that follows a target of tracking. An agricultural machine that performs self-driving may also have the function of moving partly based on the user's instructions. Moreover, a self-driving agricultural machine may operate not only in a self-driving mode but also in a manual driving mode, where the agricultural machine moves through manual operations of the driver. When performed not manually but through the action of a controller, the steering of an agricultural machine will be referred to as "automatic steering". A portion or an entirety of the controller may reside outside the agricultural machine. Control signals, commands, data, etc., may be communicated between the agricultural machine and a controller residing outside the agricultural machine. An agricultural machine that performs self-driving may move autonomously while sensing the surrounding environment, without any person being involved in the controlling of the movement of the agricultural machine. An agricultural machine that is capable of autonomous movement is able to travel within the field or outside the fields (e.g., on roads) in an unmanned manner. During an autonomous move, operations of detecting and avoiding obstacles may be performed.

A "terminal" or "terminal device" is a device for a user to input settings, data, or selected travel paths for an agricultural machine. The terminal device may be a mobile device such as a smartphone, a tablet computer, a laptop computer, or a remote control, or a stationary computer such as a desktop personal computer (PC). The terminal device may be used in a field in which an agricultural machine performs agricultural work, or at a remote place from a field in which an agricultural machine performs agricultural work.

As used herein, a "sensor" may include but is not limited to a camera, a GNSS sensor, a GPS sensor, or a LiDAR sensor or obstacle sensor that is used to detect a location of the work vehicle or the working's vehicles surroundings or environment. Any combination of sensors may be used, and more than one type of sensor may be used.

In the case where the terminal device is used at a remote place from a field in which the agricultural machine performs agricultural work, the terminal device may be a computer for monitoring purposes that is at the home or the office of a user who monitors the agricultural machine, for example. The computer for monitoring purposes may be a stationary-type computer, or a mobile computer such as a smartphone, a tablet computer, or a laptop computer. In this case, too, the user may activate application software that is installed on the terminal device, cause a map of the field to be indicated on the display, and perform a manipulation of designating a desired travel path the map for the agricultural machine. Consequently, the agricultural machine can be controlled to automatically travel a desired path through a remote manipulation using the terminal device.

A "processor" or "processing unit" is a device to generate a path along which the agricultural machine moves. In the following description, the processing unit may be referred to as a "path generating device". The processing unit may be a computer that includes one or more processors and one or more memories, for example. In that case, the processor can generate a path by executing a computer program that is stored in the memory(s). The processing unit may be mounted in the agricultural machine, or set in a remote place from the agricultural machine. One of the electronic control units (ECU) mounted in the agricultural machine may function as the processing unit. Alternatively, an external computer, e.g., a server, that communicates with the agricultural machine via a network may function as the processing unit. Furthermore, the terminal device may function as the processing unit. In other words, a processor in the terminal device may generate a travel route, and transmit a signal including information of the travel route to the agricultural machine. In that case, the terminal device can be said to internalize or be provided in the aforementioned processing unit. Thus, the terminal device and the processing unit do not need to be separate and distinct devices. Instead, a single device may function as both the terminal device and the processing unit.

According to preferred embodiments of the present invention, a user of the agricultural machine, e.g., a supervisor or administrator, may manipulate the terminal device in order to control the agricultural machine to travel a desired path. Moreover, the travel path can be changed as the user moves or manipulates the terminal device, or if an obstacle is detected in real-time.

According to preferred embodiments of the present invention, a controller is configured or programmed to control the operation of the agricultural machine so that the agricultural machine moves along a travel route. By transmitting a control signal to a drive device (e.g., a prime mover, a transmission, or a steering device) included in the agricultural machine, the controller causes the agricultural machine to move along the travel route. The controller may be an ECU or any other device that is included in the agricultural machine, or an external computer (e.g., a server) that communicates with the agricultural machine. The controller may cover the aforementioned functionality of the processing unit, i.e., the function of generating a travel route.

A geofence is known as a virtual geographic border, or edge around a location on a map, defined by GPS or RFID technology. A geofence enables software or mobile applications to trigger a response when a mobile device or vehicle enters or leaves a particular area. Geofencing creates a virtual geographical boundary that triggers the response or an action to the mobile device or vehicle when entering or exiting the boundary. An administrator or developer first establishes a virtual boundary around a certain location in GPS- or RFID-enabled software. Geofencing for vehicles is the act of creating and defining virtual boundaries that trigger a specific action when a vehicle is equipped with a GPS tracking device.

According to preferred embodiments of the present invention, a geofence is utilized to create a virtual boundary between a first trellis plot and a second (opposite) trellis plot that are adjacent to each other.

Referring to FIG. 1A, with respect to a global path plan determined for an agricultural vehicle 100, such as a tractor, the vehicle 100 starts a path in a row R1, and then turns and proceeds along the turning path TP indicated by the dashed arrow in a margin area M, in order to proceed to a path down row R4. Each of the spaces or rows R1, R2, R3, R4, and R5 are defined by rows between vegetation V, for example. The vegetation V may be a vine of a vineyard, or a plant or a crop on a field. The vegetation V may also be supported by a trellis support structure T, but a trellis structure is not always required. The margin area M includes an avenue between adjacent plots PL1 and PL2. The first plot PL1 includes an area that includes the rows R1 to R4, and the second plot PL2 is adjacent or opposite to the first plot PL1 and includes an area that includes the row R5 and a trellis area TA. As shown in FIG. 1A, for example, the row R1, corresponds to a "first row," the row R4 corresponds to a "second row," and the row R5 corresponds to a "third row." The areas and elements in FIG. 1A and similar drawings herein are not necessarily drawn to scale, and thus are not actual representations of their proportions or sizes.

As shown in FIG. 1A, when the tractor 100 turns from the margin area M into the row R4, in a situation when the tractor's length, width, or overall size which may include an implement 300 attached to the tractor 100, is relatively large with respect to the limited space in the margin area M which restricts movement of the tractor, the tractor 100 may need to reverse or turn back, for example, into row R5, as indicated by arrow R, possibly many times. In such situations, several points of turn and reverse movements R may be required. Further, the tractor needs to distinguish between the trellis area TA and the row or area R5 to avoid obstacles or prevent collision with the opposing trellis in the plot PL2. LiDAR (Light Detection and Ranging), camera(s), and/or other sensor(s) can be used for obstacle avoidance when reversing into the row R5. It is possible for the vehicle to enter the row R5 when the vehicle 100 turns from the margin area M into the row R4 if a global path plan determines a path that extends within the row 5 and the LiDAR obstacle avoidance does not prevent such a path, or if the second plot PL2 is an open field in which the tractor can freely traverse.

Figure 1B:
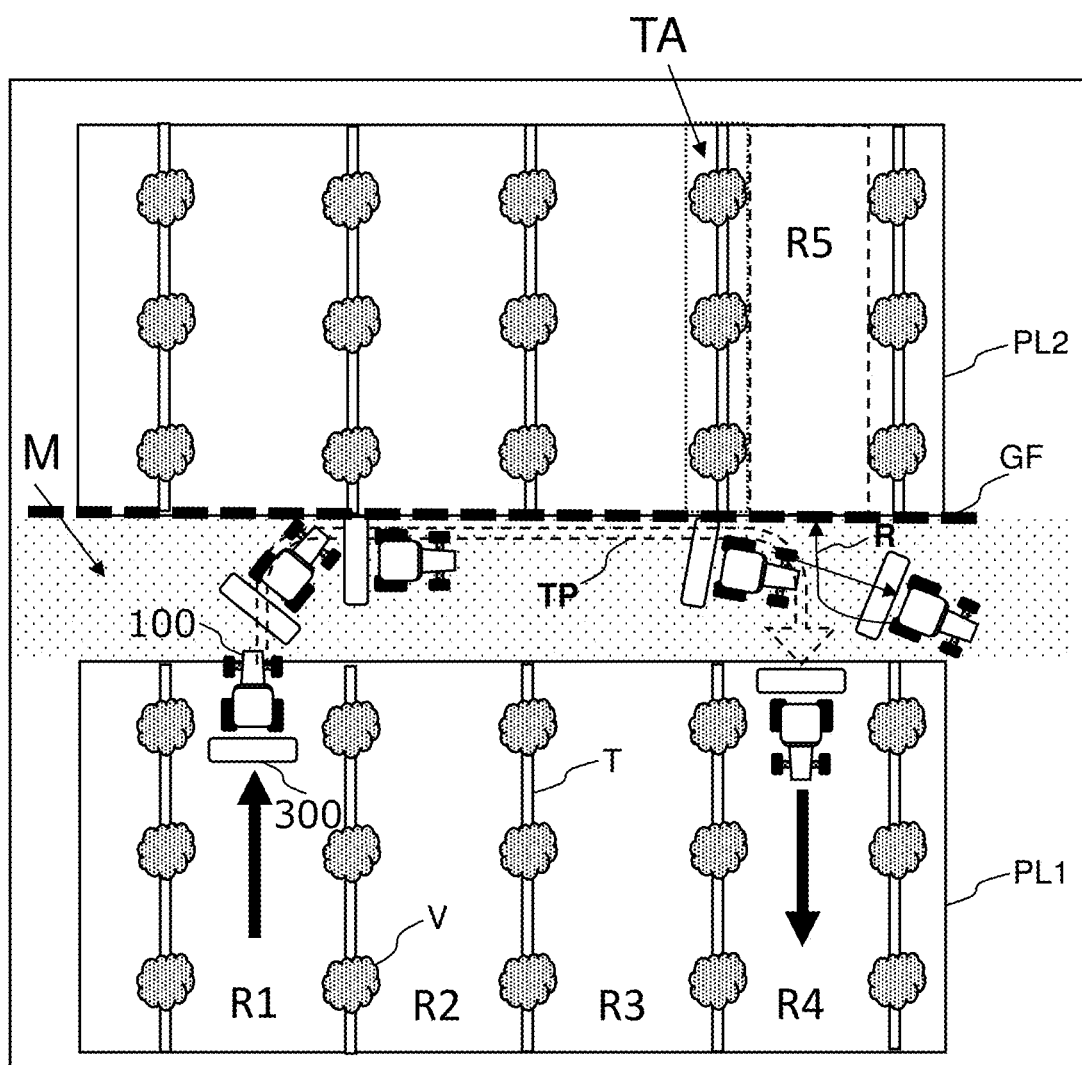
FIG. 1B shows a turning path route of an autonomous agricultural vehicle when a geofence is set at the opposite side trellis.

However, referring to FIG. 1B, a geofence can be used to define a boundary between a travelable area (e.g., the margin area M) in which a vehicle is allowed to travel and an exclusion area where the vehicle should not travel. The geofence GF can be manually created by GPS in a planning interface of the travel route of the vehicle, for example. If a geofence, shown as a dashed line GF between the margin area M and the second plot PL2 (or other adjacent area instead of the second plot PL2), has been created (e.g., manually created using GPS in a planning interface), the vehicle is not allowed to enter the second plot PL2, and is therefore prohibited from reversing into the row R5 which is included in the second plot PL2. This restricts or limits movements of the tractor if the tractor is required to make multiple reverse movements R when turning from the turning path TP into the row R4. In some cases, it is necessary for the geofence GF to be established in order to prevent the tractor 100 from colliding with obstacles, building structures, or roads that may be present in the area of the second plot PL2.

Preferred embodiments of the present invention solve the above-described problems by providing novel systems and methods of automatic turning control which manage boundaries and judge conditions to determine whether or not the tractor is allowed to enter or reverse into the opposite side plot (e.g., row R5 of plot PL2) or the area of the plot PL2 that is adjacent to the margin area M when the trellis structures T are not present.

Figure 2:
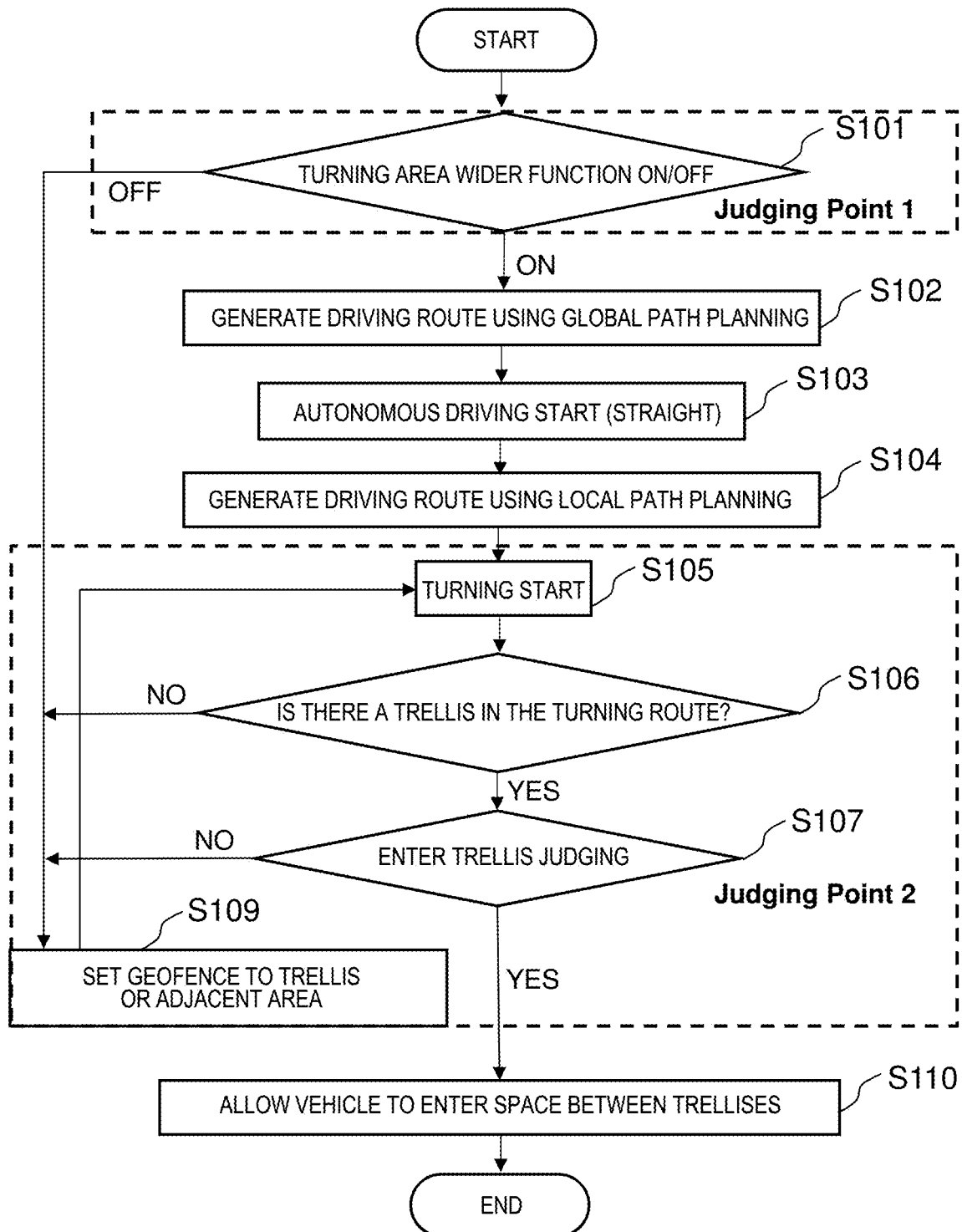
FIG. 2 is a flowchart showing a process of turning control between trellises for a vehicle during self-driving.

FIG. 2 is a flow chart showing a process of turning control between trellises for a vehicle during self-driving in accordance with preferred embodiments of the present invention. The purpose of the functions in the flow chart in FIG. 2 is for the work machine 100 to use the opposite side trellis (e.g., row R5 of plot PL2) or adjacent area of PL2 while making the turn designated by the turning path TP when entering the second row R4 trellis. When the tractor 100 has an implement 300 attached thereto, it is undesirable for the tractor to make several frequent turning or steering movements. Several turning or steering movements means going right side to left side or vice versa at many frequencies, which is inefficient. It is desirable for the tractor's route heading to be stable. In order to make the heading stable, the boundaries of the turning route utilizes the opposite side trellis (or adjacent area) in order to obtain a longer merging or turning route for the tractor when entering the second row R4 trellis.

As shown in the flow chart in FIG. 2, Judging Point 1 determines whether or not a Turning Area Wider function, which corresponds to a "user select function" (entering into the other side trellis) is ON or OFF. The Judging Point 1 is determined based on information that is obtainable from a computer server or stored in the vehicle before the vehicle starts driving (e.g., before the vehicle starts a traveling route or before a global path planning process is executed). In the Judging Point 1, the ON/OFF determination is made based on the user's intention and/or the information that the vehicle has in advance. Thereafter, as shown in the flow chart in FIG. 2, a Judging Point 2 includes processes (e.g., S106, S107) of detecting environmental information regarding an opposite side trellises or path planning issues, and determining whether the vehicle is able to enter the opposite side trellis (or whether the vehicle should avoid entering the opposite side trellis). This two-step judgement by different categories of information in accordance with the features of Judging Point 1 and Judging Point 2 according to preferred embodiments of the present invention will be described in detail as follows.

Judging Point 1 is judged by a first category of information (corresponding to a "first condition group") including but not limited to, one or more of the following items as shown in FIG. 3A:

User Select (manually selected by user to be ON/OFF)
Type of Implement (what kind of implement is attached to the tractor)
Trellis in the adjacent area (e.g., is there a trellis in the adjacent area or what type of trellis is in the other side plot?)
Adjacent area is a road, building structure, or other obstacle
Trellis row width vs. Tractor+Implement width
Slope of the adjacent field (how much slope in the other side trellis?)
Work plan in adjacent field (is there a work plan in the other side trellis?)

The items in the first condition group of Judging Point 1, such as "Trellis in the adjacent area" and/or "Trellis row width vs. Tractor+Implement width" includes information that is only available when it is time for the vehicle to turn into a row of trellis. If the vehicle's processing unit or computer server stores this kind of information in advance (before starting driving), the system can judge or make a determination based on this condition. If this information is not known or stored in advance, then the control system does not judge this condition.

Figure 5A:
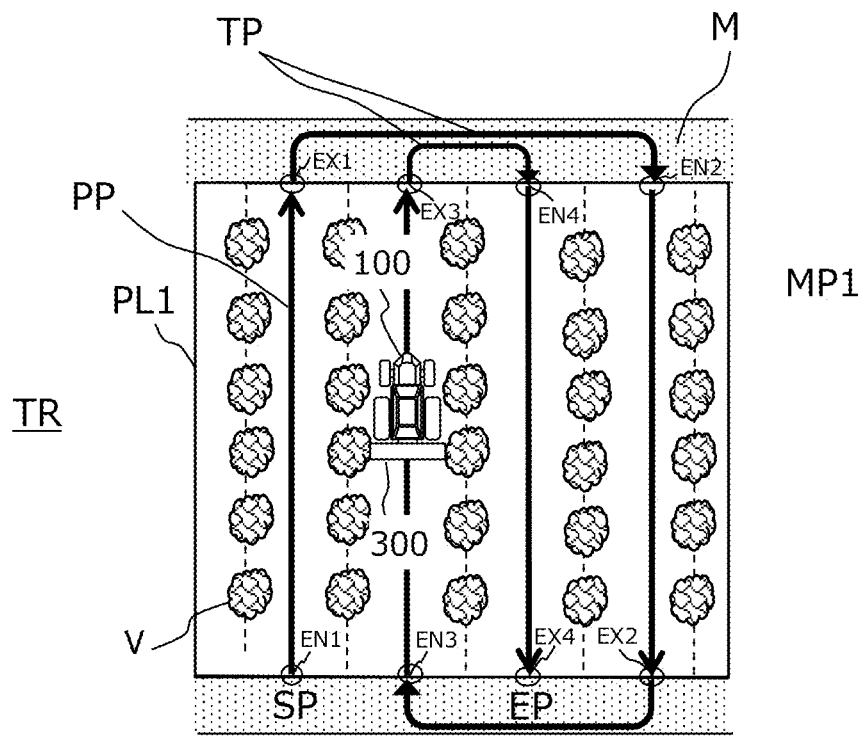
FIGS. 5A and 5B show examples of a work vehicle automatically traveling along travel routes and target paths within plots of trellises.
Figure 5B:
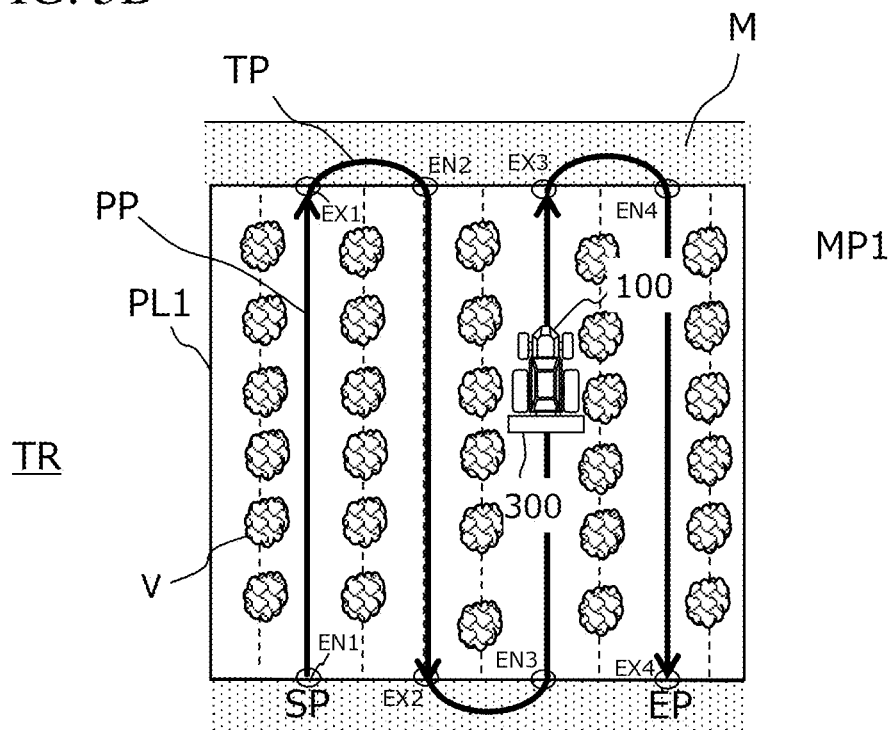

Referring to FIGS. 2 and 3A, if the "Turning Area Wider function" at step S101 is determined to be OFF, then the process proceeds to the step of setting a geofence to the opposite trellis or adjacent area (S109). If the "Turning Area Wider function" is ON, then the process proceeds to step S102 of generate a driving route using Global Path Planning. FIGS. 5A and 5B show non-limiting examples of a driving travel route TR within an agricultural field map MP1 using Global Path Planning in Step 102. The travel route TR includes a start point SP, parallel paths PP, turning paths TP, and an end point EP. Referring back to FIG. 2, Step 101 involves Judging Point 1, the details of which are shown in FIG. 3A and further described below. As indicated in FIG. 3A, the information of Judging Point 1 is available information before driving (e.g., before the vehicle starts a traveling route or before a global path planning process is executed) and based on user input data at the terminal device or stable sources of information. When the Autonomous Driving Starts at S103, the Local Path Planning is created (S104) to generate a drive route using real-time data available from sensors. Global Path Planning at step S102, autonomous driving at S103, and local path planning at S104 is described in further detail below.

When it comes to turning, for example, from the margin area M into a row of the plot PL1, the tractor starts turning at S105, and attempts to enter into the other side trellis ("third row" or "adjacent area"), based on the Judging Point 2 at this time in the process. If the turning area wider function is determined to be "ON" based on Judging Point 1 at S101 before starting the autonomous driving at S103, then the controller decides whether or not the tractor is allowed to enter the opposite trellis ("third row" or "adjacent area") based on Judging Point 2 which includes a determination of at least one parameter in real-time of receiving or obtaining information from a LIDAR, camera(s), or other sensor(s). The turning area wider function may be set to be ON or OFF by the user via a "user select function". However, regardless of whether or not the user sets the turning area wider function ("user select function") to be "ON" or "OFF", if the system judges "NO" based on any of the items in the first condition group by Judging Point 1, the turning area wider function is set to "OFF" automatically.

Judging Point 2 is determined based on information regarding the opposite side trellises or adjacent area that is detected by one or more sensors installed on the vehicle. As described above, in Judging Point 1, the ON/OFF decision of the "turning area wider function" is made based on the user's intention or information the vehicle has in advance, before starting driving. Thereafter, the process of Judging Point 2 includes detecting environmental information regarding the opposite side trellises or path planning issues, and determining whether the vehicle is able to enter the opposite side trellises or adjacent area, or whether the vehicle should avoid entering the opposite side trellises or adjacent area.

The details of the conditions ("second condition group") of Judging Point 2, as shown in FIG. 4, includes, but is not limited to, one or more of the following items:
  Trellis Type (I type vineyard training or T type vineyard training)
  Inflation Layer Value
  Trellis row width vs. Tractor+Implement width,
  Number of reverses (e.g., switching to reverse movement, how many times are available or not, or this is a limited number)
  Slope of the opposite side trellis row (e.g., area R5)
  Trellis row direction (e.g., is direction of the opposite side trellis the same or different as the row the tractor is entering?)
  Turning place (is the tractor turning in the center of the field or the very edge of the field?)
  if obstacles are in the opposite side trellis Based on one or more of the above information for Judging Point 2, the controller decides if entering the opposite side trellis is physically available or not at step S107 in the process. If the enter trellis judging step at S107 is determined to be "YES", at step S110, the controller allows the vehicle or tractor 100 to enter or reverse into the space (e.g., "third row" R5) of the opposite side trellis (e.g., plot PL2) as shown in FIG. 1a. More specifically, at step S110, the controller allows the vehicle 100 to enter the space between the trellises when the local path is created in the space between the trellises. In the other words, if the local path planner does not create a path (e.g., path R as shown in FIG. 1A) which enters the space (e.g., R5 as shown in FIG. 1A) between the opposite side (e.g., plot PL2 as shown in FIG. 1A), the vehicle does not need to enter the opposite side. After step S110, the controller commands the tractor 100 to switch back to forward driving mode to complete the turn along the turning path TP, and then the tractor proceeds to traverse through the next trellis, shown as, for example, the "second row" R4 in FIG. 1A.

Figure 6:
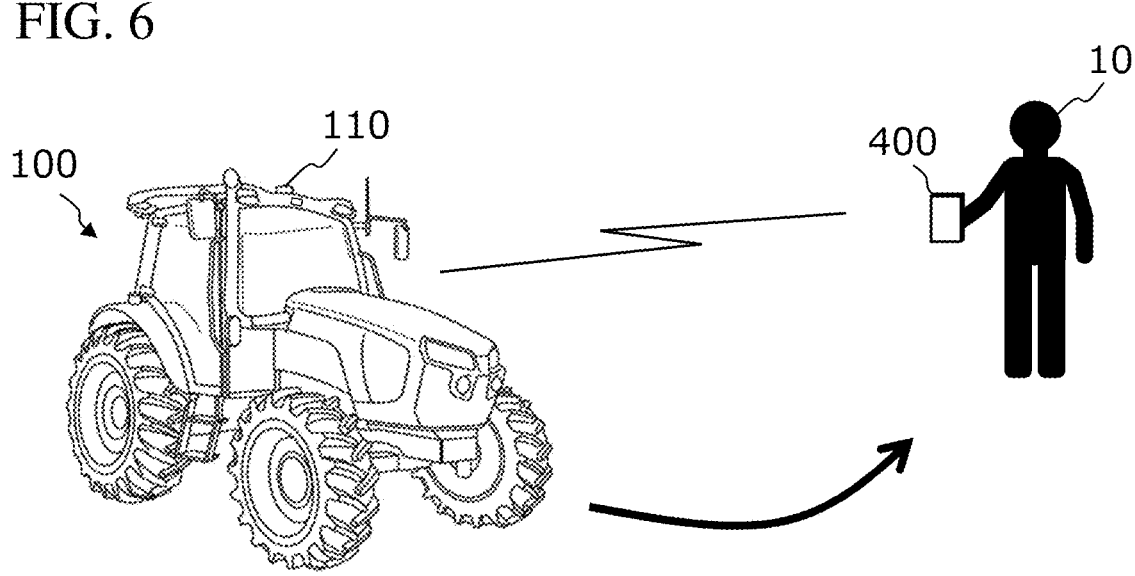
FIG. 6 is a diagram for describing an overview of an autonomous tractor system according to a preferred embodiment of the present invention.

FIG. 6 is a diagram for describing an overview of an autonomous tractor system according to a preferred embodiment of the present disclosure. FIG. 6 illustrates a work vehicle 100 and a terminal 400 that providers a user interface to a user 10. The work vehicle 100 is an example of the aforementioned agricultural machine, and the terminal 400 is an example of the aforementioned terminal device. In the present preferred embodiment, the work vehicle 100 is a tractor. The tractor can have an implement attached to its rear and/or its front. While performing agricultural work according to the particular type of implement, the tractor is able to automatically travel within a field. The agricultural work to be performed in the present preferred embodiment may be any task including e.g., tilling, seeding, planting of crops, spraying, or harvesting. The techniques according to the present preferred embodiment and any subsequent preferred embodiment are similarly applicable to agricultural machines other than tractors.

The work vehicle 100 has a self-driving function. In other words, the work vehicle 100 travels by the action of a controller, rather than manually. The controller according to the present preferred embodiment is provided inside the work vehicle 100, and is able to control both the speed and steering of the work vehicle 100.

The work vehicle 100 includes a positioning device 110, including a GNSS receiver. Based on the position of the work vehicle 100 as identified by the positioning device 110 and a target path previously stored in a storage device, the controller causes the work vehicle 100 to automatically travel. In addition to controlling the travel of the work vehicle 100, the controller also controls the operation of the implement. As a result, while automatically traveling, the work vehicle 100 is able to perform a task or work by using the implement.

The terminal 400 may be a mobile apparatus such as a smartphone, a tablet computer, or a remote control. The terminal 400 may be used by a user 10 who is at a remote position from the work vehicle 100 within a field. In response to a manipulation by the user 10, the terminal 400 transmits command signals to the work vehicle 100. Upon receiving the command signals, the work vehicle 100 automatically moves along the designated travel route set by the user.

In a preferred embodiment of the present invention, the work vehicle 100 includes a processing unit (also referred to as a "processor" or "path generating device") to generate a path along which the work vehicle 100 moves. The path generating device generates the travel path TR along which the work vehicle 100 travels when performing tasks within the field. Based on the information entered by the user and map information stored in the storage device, the path generating device generates a travel route. The controller controls a drive device (e.g., a steering device, a transmission, and a power unit) of the work vehicle 100 along the generated travel route. As a result, the work vehicle 100 automatically moves along the travel route.

Hereinafter, more specific examples of the configuration and operation of a system according to the present preferred embodiment will be described.

Figure 7:
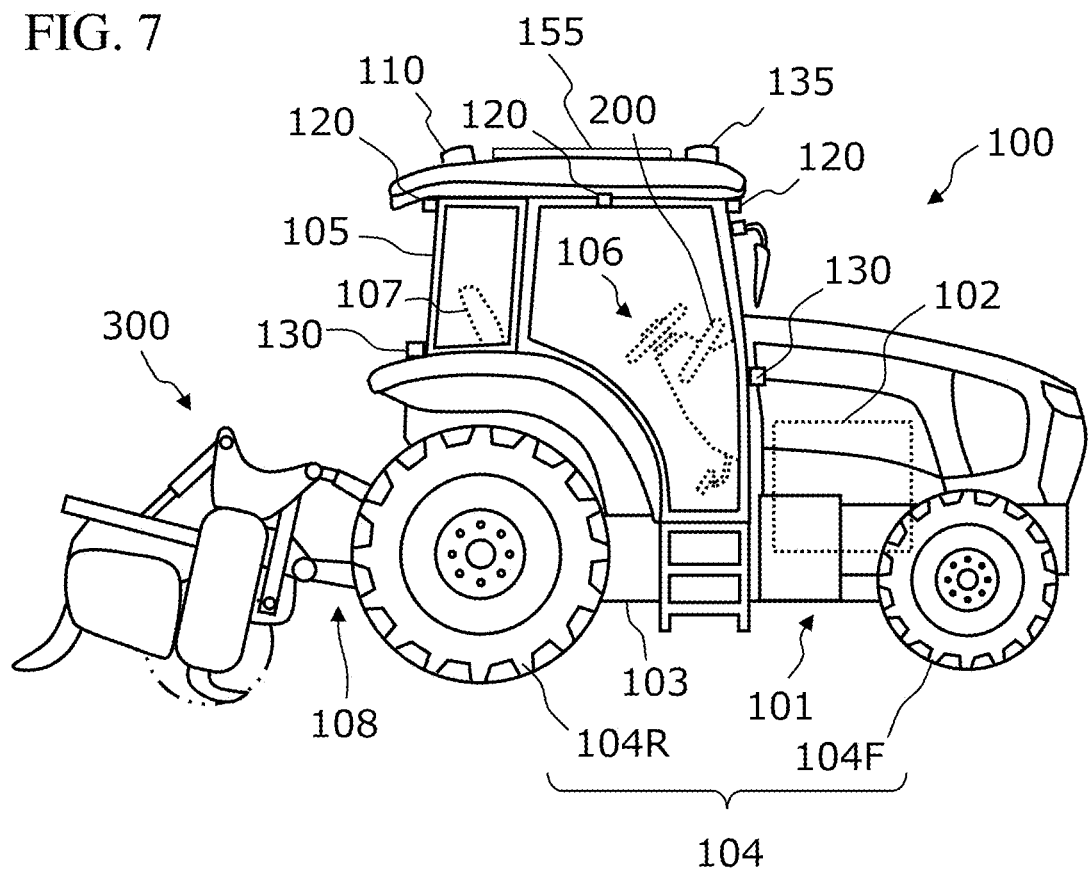
FIG. 7 is a side view schematically showing a work vehicle and an implement attached to the work vehicle according to a preferred embodiment of the present invention.

FIG. 7 is a side view schematically showing the work vehicle 100 and an example implement 300 that is linked to the work vehicle 100. The work vehicle 100 according to the present preferred embodiment functions in both a manual driving mode and a self-driving mode. In the self-driving mode, the work vehicle 100 is able to perform unmanned travel.

As shown in FIG. 7, the work vehicle 100 includes a vehicle body 101, a prime mover (engine) 102, and a transmission 103. On the vehicle body 101, tires (wheels) 104 and a cabin 105 are provided. The tires 104 include a pair of front wheels 104F and a pair of rear wheels 104R. Inside the cabin 105, a driver's seat 107, a steering device 106, an operational terminal 200, and switches for manipulation are provided. The front wheels 104F and/or the rear wheels 104R may be crawlers, rather than tires.

The work vehicle 100 shown in FIG. 7 further includes a plurality of cameras 120. The cameras 120 may be provided at the front/rear/right/left of the work vehicle 100, for example. The cameras 120 capture images of the surrounding environment of the work vehicle 100, and generate image data. The images acquired by the cameras 120 may be transmitted to a computer for monitoring purposes (also referred to as "monitoring terminal") which is responsible for remote monitoring, for example. The images are used to monitor the work vehicle 100 during unmanned driving. The cameras 120 may be provided as necessary, and may be omitted if unnecessary.

The work vehicle 100 further includes the positioning device 110. The positioning device 110 includes a GNSS receiver. The GNSS receiver includes an antenna to receive a signal(s) from a GNSS satellite(s) and a processing circuit to determine the position of the work vehicle 100 based on the signal(s) received by the antenna. The positioning device 110 receives a GNSS signal(s) transmitted from a GNSS satellite(s), and performs positioning on the basis of the GNSS signal(s). GNSS is a general term for satellite positioning systems, such as GPS (Global Positioning System), QZSS (Quasi-Zenith Satellite System, e.g., MICHIBIKI), GLONASS, Galileo, BeiDou, and the like. Although the positioning device 110 in the present preferred embodiment is disposed above the cabin 105, it may be disposed at any other position.

Instead of or in addition to the GNSS receiver, the positioning device 110 may include any other type of device, such as a LiDar sensor 135. The positioning device 110 may utilize the data acquired by the cameras 120 for positioning. When objects serving as characteristic points exist in the environment that is traveled by the work vehicle 100, the position of the work vehicle 100 can be estimated with a high accuracy based on data that is acquired with the LiDar sensor 135 or cameras 120 and an environment map that is previously recorded in the storage device. The LiDAR sensor 135 or cameras 120 may be used together with the GNSS receiver. By correcting or complementing position data based on the GNSS signal(s) using the data acquired by the LiDAR sensor 135 or cameras 120, it becomes possible to identify the position of the work vehicle 100 with a higher accuracy. Furthermore, the positioning device 110 may complement the position data by using a signal from an inertial measurement unit (IMU). The IMU can measure tilts and minute motions of the work vehicle 100. By complementing the position data based on the GNSS signal using the data acquired by the IMU, the positioning performance can be improved.

In a preferred embodiment of the present invention, the work vehicle 100 further includes a plurality of obstacle sensors 130. In the example shown in FIG. 7, the obstacle sensors 130 are provided at the front and the rear of the cabin 105. The obstacle sensors 130 may be disposed at other positions. For example, one or more obstacle sensors 130 may be disposed at any position selected from among the sides, the front, and the rear of the vehicle body 101, and the cabin 105. The obstacle sensors 130 may be used to detect obstacles in the surroundings during self-traveling to come to a halt or detour around it.

The positioning device 110, cameras 120, obstacle sensors 130, and LiDar sensor 135 may be disposed at other positions. Any combination of the positioning device 110, cameras 120, obstacle sensors 130, and LiDAR sensor 135 may be used, and more than one type of sensor may be used.

A solar panel 155 may be provided at the top or any suitable location of the work vehicle 100 to generate electrical energy to be stored in a battery of the work vehicle 100. The solar powered electrical energy can be used to drive various electrical systems and components of the work vehicle including an electric motor if preferably included.

The prime mover 102 may be a diesel engine, for example. Instead of a diesel engine, an electric motor may be used. The transmission 103 can change the propulsion and the moving speed of the work vehicle 100 through a speed changing mechanism. The transmission 103 can also switch between forward travel and backward travel of the work vehicle 100.

The steering device 106 includes a steering wheel, a steering shaft connected to the steering wheel, and a power steering device to assist in the steering by the steering wheel. The front wheels 104F are the wheels responsible for steering, such that changing their angle of turn (also referred to as "steering angle") can cause a change in the traveling direction of the work vehicle 100. The steering angle of the front wheels 104F can be changed by manipulating the steering wheel. The power steering device includes a hydraulic device or an electric motor to supply an assisting force for changing the steering angle of the front wheels 104F. When automatic steering is performed, under the control of a controller disposed in the work vehicle 100, the steering angle may be automatically adjusted by the power of the hydraulic device or electric motor.

A linkage device 108 is provided at the rear of the vehicle body 101. The linkage device 108 may include, e.g., a three-point linkage (also referred to as a "three-point link" or a "three-point hitch"), a PTO (Power Take Off) shaft, a universal joint, and a communication cable. The linkage device 108 allows the implement 300 to be attached to or detached from the work vehicle 100. The linkage device 108 is able to raise or lower the three-point link with a hydraulic device, for example, thus changing the position or attitude of the implement 300. Moreover, motive power can be sent from the work vehicle 100 to the implement 300 via the universal joint. While towing the implement 300, the work vehicle 100 allows the implement 300 to perform a predetermined task. The linkage device may be provided frontward of the vehicle body 101. In that case, the implement may be connected frontward of the work vehicle 100.

Although the implement 300 shown in FIG. 7 is a rotary tiller, the implement 300 is not limited to a rotary tiller. For example, any arbitrary implement such as a seeder, a spreader, a transplanter, a mower, a rake implement, a baler, a harvester, a sprayer, or a harrow, may be connected to the work vehicle 100 for use.

The work vehicle 100 shown in FIG. 7 is capable of human driving; alternatively, it may only support unmanned driving. In that case, component elements which are only required for human driving, e.g., the cabin 105, the steering device 106, and the driver's seat 107 do not need to be provided in the work vehicle 100. An unmanned work vehicle 100 may travel via autonomous driving, or by remote manipulation by a user.

Figure 8:
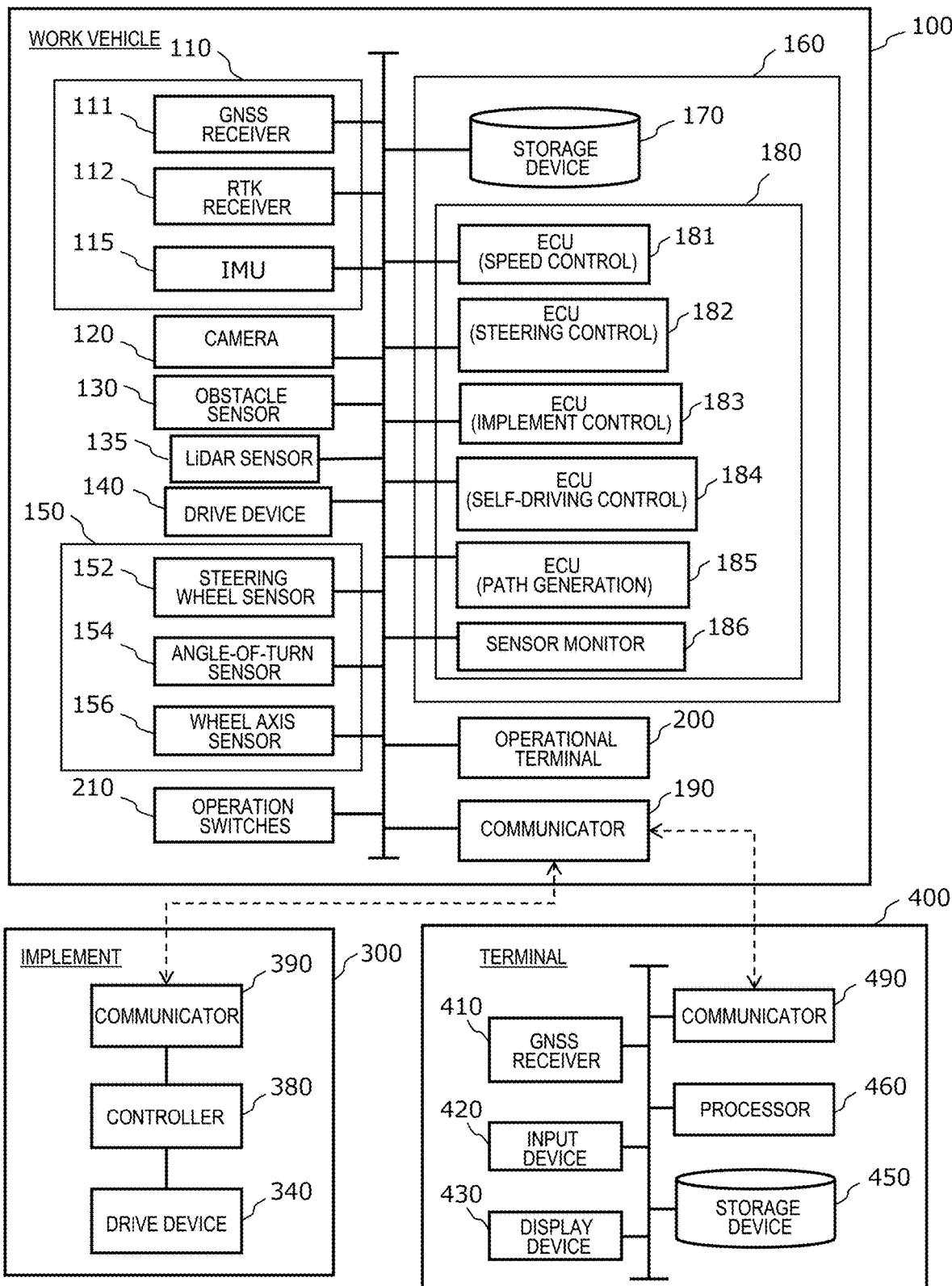
FIG. 8 is a block diagram showing an example configuration of a work vehicle, an implement, and a user terminal according to a preferred embodiment of the present invention.

FIG. 8 is a block diagram showing an example configuration of the work vehicle 100, the implement 300, and the user terminal 400. The work vehicle 100 and the implement 300 can communicate with each other via a communication cable that is included in the linkage device 108. The work vehicle 100 and the terminal 400 are able to communicate with each other via wireless communication.

In addition to the positioning device 110, the cameras 120, the obstacle sensors 130, the LiDAR sensor 135, and the operational terminal 200, the work vehicle 100 in the example of FIG. 8 includes a drive device 140, sensors 150 to detect the operating status of the work vehicle 100, a control system 160, a communicator 190, and operation switches 210. The positioning device 110 includes a GNSS receiver 111, an RTK receiver 112, and an inertial measurement unit (IMU) 115. The sensors 150 include a steering wheel sensor 152, an angle-of-turn sensor 154, and a wheel axis sensor 156. The control system 160 includes a storage device 170 and a controller 180. The controller 180 includes a plurality of electronic control units (ECU) 181 to 185 and a sensor monitor 186. The implement 300 includes a drive device 340, a controller 380, and a communicator 390. The terminal 400 includes a GNSS receiver 410, an input device 420, a display device 430, a storage device 450, a processor 460, and a communicator 490. Note that FIG. 8 shows component elements which are relatively closely related to the self-driving operation by the work vehicle 100, while other component elements are omitted from illustration.

Figure 9:
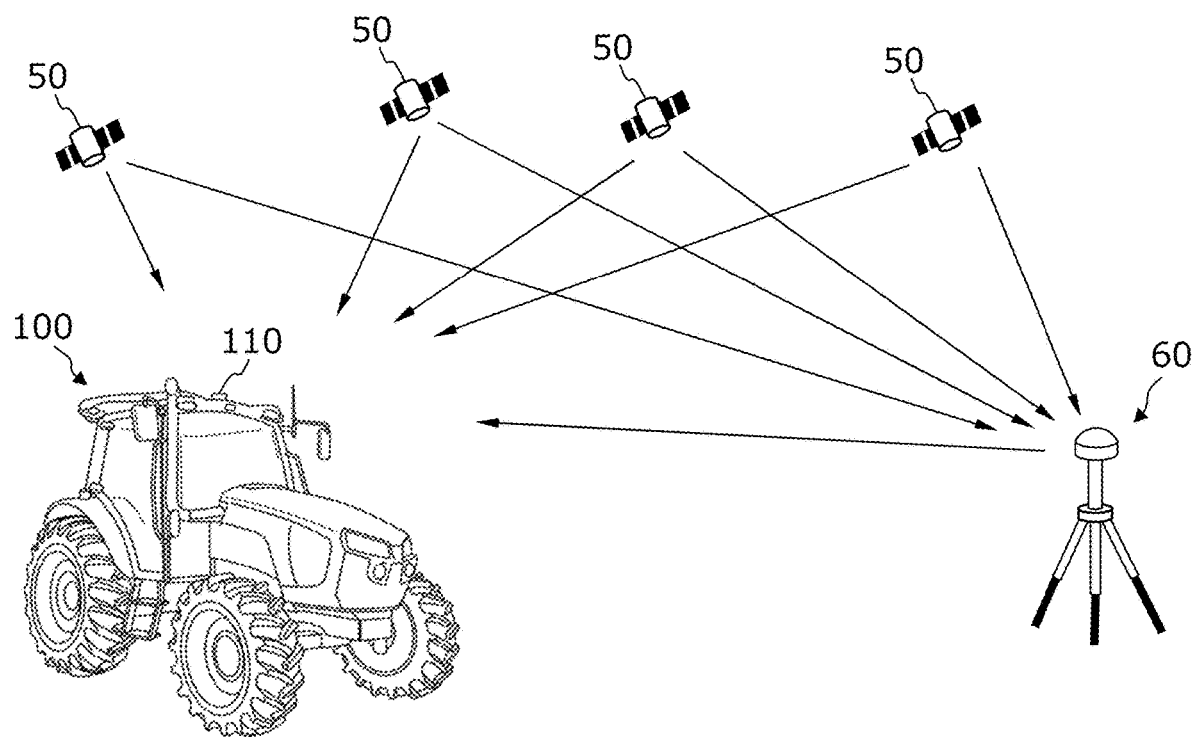
FIG. 9 is a conceptual diagram showing an example work vehicle which performs positioning based on an RTK-GNSS.

The positioning device 110 shown in FIG. 8 performs positioning of the work vehicle 100 by utilizing an RTK (Real Time Kinematic)-GNSS. FIG. 9 is a conceptual diagram showing an example of the work vehicle 100 which performs positioning based on an RTK-GNSS. In the positioning based on an RTK-GNSS, not only GNSS signals transmitted from multiple GNSS satellites 50, but also a correction signal that is transmitted from a reference station 60 is used. The reference station 60 may be disposed near the field that is traveled by the work vehicle 100 (e.g., at a position within 1 km of the work vehicle 100). The reference station 60 generates a correction signal of, e.g., an RTCM format based on the GNSS signals received from the multiple GNSS satellites 50, and transmits the correction signal to the positioning device 110. The GNSS receiver 111 in the positioning device 110 receives the GNSS signals transmitted from the multiple GNSS satellites 50. The RTK receiver 112, which includes an antenna and a modem, receives the correction signal transmitted from the reference station 60. The positioning device 110 may include a processor which calculates the position of the work vehicle 100 based on the GNSS signals and the correction signal, thus achieving positioning. Use of an RTK-GNSS enables positioning with an accuracy on the order of several cm of errors, for example. Positional information (including latitude, longitude, and altitude information) is acquired through the highly accurate positioning by an RTK-GNSS. The positioning device 110 may calculate the position of the work vehicle 100 as frequently as, e.g., one to ten times per second.

Note that the positioning method is not limited to an RTK-GNSS; any arbitrary positioning method (e.g., an interferometric positioning method or a relative positioning method) that provides positional information with the necessary accuracy can be used. For example, positioning may be performed by utilizing a VRS (Virtual Reference Station) or a DGPS (Differential Global Positioning System). In the case where positional information with the necessary accuracy can be obtained without the use of the correction signal transmitted from the reference station 60, positional information may be generated without using the correction signal. In that case, the positioning device 110 may lack the RTK receiver 112.

The positioning device 110 in the present preferred embodiment further includes an IMU 115. The IMU 115 includes a 3-axis accelerometer and a 3-axis gyroscope. The IMU 115 may include a direction sensor such as a 3-axis geomagnetic sensor. The IMU 115 functions as a motion sensor which can output signals representing parameters such as acceleration, velocity, displacement, and attitude of the work vehicle 100. Based not only on the GNSS signals and the correction signal but also on a signal that is output from the IMU 115, the positioning device 110 can estimate the position and orientation of the work vehicle 100 with a higher accuracy. The signal that is output from the IMU 115 may be used for the correction or complementation of the position that is calculated based on the GNSS signals and the correction signal. The IMU 115 outputs a signal more frequently than the GNSS signals. Utilizing this highly frequent signal allows the position and orientation of the work vehicle 100 to be measured more frequently (e.g., about 10 Hz or above). Instead of the IMU 115, a 3-axis accelerometer and a 3-axis gyroscope may be separately provided. The IMU 115 may be provided as a separate device from the positioning device 110.

In addition to or instead of the GNSS receiver 111, the RTK receiver 112, and the IMU 115, the positioning device 110 may include other kinds of sensors, e.g., LiDAR sensors or image sensors. Depending on the environment that is traveled by the work vehicle 100, it is possible to estimate the position and orientation of the work vehicle 100 with a high accuracy based on data from such sensors.

In the example of FIG. 8, the processor of the positioning device 110 calculates the position of the work vehicle 100 based on signals which are output from the GNSS receiver 111, the RTK receiver 112, and the IMU 115. The positional calculation may instead be performed by any device other than the positioning device 110. For example, the controller 180 or an external computer may acquire output data from each receiver and each sensor as is required for positioning, and calculate the position of the work vehicle 100 based on such data.

In addition, each camera 120 is an imager that images the surrounding environment of the work vehicle 100, and includes image sensors, an optical system including one or more lenses and a signal processing circuit. During travel of the work vehicle 100, the cameras 120 image the surrounding environment of the work vehicle 100, and generate image data (e.g., motion pictures). The images generated by the cameras 120 may be used when a remote supervisor checks the surrounding environment of the work vehicle 100 with the monitoring terminal, for example. The images generated by the cameras 120 may also be used for the purpose of positioning or obstacle detection. As shown in FIG. 8, a plurality of cameras 120 may be provided at different positions on the work vehicle 100, or a single camera may be provided.

The obstacle sensors 130 detect objects around the work vehicle 100. Each obstacle sensor 130 may include a laser scanner or an ultrasonic sonar, for example. When an object exists at a position closer to the obstacle sensor 130 than a predetermined distance, the obstacle sensor 130 outputs a signal indicating the presence of an obstacle. A plurality of obstacle sensors 130 may be provided at different positions of the work vehicle 100. For example, a plurality of laser scanners and a plurality of ultrasonic sonars may be disposed at different positions of the work vehicle 100. Providing a multitude of obstacle sensors 130 can reduce blind spots in monitoring obstacles around the work vehicle 100.

The drive device 140 includes various devices that are needed for the traveling of the work vehicle 100 and the driving of the implement 300, e.g., the aforementioned prime mover 102, transmission 103, steering device 106, and linkage device 108. The prime mover 102 may include an internal combustion engine such as a diesel engine. Instead of an internal combustion engine or in addition to an internal combustion engine, the drive device 140 may include one or more electric motors that are dedicated to traction and steering purposes.

The steering wheel sensor 152 measures the angle of rotation of the steering wheel of the work vehicle 100. The angle-of-turn sensor 154 measures the angle of turn of the front wheels 104F, which are the wheels responsible for steering. Measurement values by the steering wheel sensor 152 and the angle-of-turn sensor 154 are used for steering control by the controller 180.

The wheel axis sensor 156 measures the rotational speed, i.e., the number of revolutions per unit time, of a wheel axis that is connected to a tire 104. The wheel axis sensor 156 may be a sensor utilizing a magnetoresistive element (MR), a Hall generator, or an electromagnetic pickup, for example. The wheel axis sensor 156 may output a numerical value indicating the number of revolutions per minute (unit: rpm) of the wheel axis, for example. The wheel axis sensor 156 is used to measure the speed of the work vehicle 100.

The storage device 170 includes one or more storage media such as a flash memory or a magnetic disc. The storage device 170 stores various data generated by the positioning device 110, the cameras 120, the obstacle sensors 130, the sensors 150, and the controller 180. The data that is stored by the storage device 170 may include map data in the environment that is traveled by the work vehicle 100, data of a target path of during self-driving, and data representing an already-worked area. The storage device 170 also stores a computer program(s) to cause the ECUs in the controller 180 to perform various operations (to be described later). Such a computer program(s) may be provided for the work vehicle 100 via a storage medium (e.g., a semiconductor memory or an optical disc) or through telecommunication lines (e.g., the Internet). Such a computer program(s) may be marketed as commercial software.

The controller 180 includes a plurality of ECUs. The plurality of ECUs may include, for example, an ECU 181 for speed control, an ECU 182 for steering control, an ECU 183 for implement control, an ECU 184 for self-driving control, and an ECU 185 for path generation. The ECU 181 controls the prime mover 102, the transmission 103, and the brakes included in the drive device 140, thus controlling the speed of the work vehicle 100. The ECU 182 controls the hydraulic device or electric motor included in the steering device 106 based on a measurement value of the steering wheel sensor 152, thus controlling the steering of the work vehicle 100. In order to cause the implement 300 to perform a desired operation, the ECU 183 controls the operation of the three-point link, the PTO shaft, etc., that are included in the linkage device 108. Also, the ECU 183 generates a signal to control the operation of the implement 300, and transmits this signal from the communicator 190 to the implement 300. Based on signals which are output from the positioning device 110, the steering wheel sensor 152, the angle-of-turn sensor 154, and the wheel axis sensor 156, the ECU 184 performs computation and control for achieving self-driving. During self-driving, the ECU 184 sends the ECU 181 a command to change the speed, and sends the ECU 182 a command to change the steering angle. In response to the command to change the speed, the ECU 181 controls the prime mover 102, the transmission 103, or the brakes to change the speed of the work vehicle 100. In response to the command to change the steering angle, the ECU 182 controls the steering device 106 to change the steering angle. The ECU 185, which functions as the aforementioned processing unit (i.e., the path generating device), generates a target path for the work vehicle 100, and records it to the storage device 170. Furthermore, the ECU 185 generates a travel route that leads the tractor towards the target path when commanded from the terminal 400. The ECU 184 sends necessary commands to the ECUs 181 and 182 so that the work vehicle 100 moves along the path generated by the ECU 185.

The controller 180 includes a sensor monitor 186 that monitors data measured by the camera 120, obstacle sensor 130, and LiDAR sensor 135.

Through the action of these ECUs, the controller 180 realizes self-driving. During self-driving, the controller 180 controls the drive device 140 based on the position of the work vehicle 100 as measured or estimated by the positioning device 110 and the target path or travel route stored in the storage device 170. As a result, the controller 180 causes the work vehicle 100 to travel along the target path or travel route.

The plurality of ECUs included in the controller 180 may communicate with one another according to a vehicle bus standard such as CAN (Controller Area Network). Instead of CAN, faster communication methods may be used, e.g., Automotive Ethernet (registered trademark). Although the ECUs 181 to 185 are illustrated as individual corresponding blocks in FIG. 8, each of these functions may be implemented by a plurality of ECUs. Alternatively, an onboard computer that integrates the functions of at least some of the ECUs 181 to 185 may be provided. The controller 180 may include ECUs other than the ECUs 181 to 185, and any number of ECUs may be provided in accordance with functionality. Each ECU includes a processing circuit including one or more processors.

The communicator 190 is a circuit that performs communications with the communicator 390 of the implement 300. The communicator 190 includes circuitry to perform exchanges of signals complying with an ISOBUS standard such as ISOBUS-TIM, for example, between itself and the communicator 390 of the implement 300. This causes the implement 300 to perform a desired operation, or allows information to be acquired from the implement 300. The communicator 190 may further include a communication circuit and an antenna to exchange signals complying with any arbitrary wireless communication standard (e.g., Wi-Fi (registered trademark), 3G, 4G, 5G or other cellular mobile communication, or Bluetooth (registered trademark)) between itself and the communicator 490 of the terminal 400. Moreover, the communicator 190 can communicate with an external computer via a wired or wireless network. The external computer may be a server computer which centralizes management of information concerning fields by using a cloud, and assists in agriculture by utilizing the data on the cloud, for example. Such an external computer may be configured to perform a part of the functionality of the work vehicle 100. For example, the path generation function of the ECU 185 may be performed by an external computer. In that case, the external computer functions as the aforementioned "processor" or "processing unit".

The operational terminal 200 is a terminal for the user to perform a manipulation related to the traveling of the work vehicle 100 and the operation of the implement 300, and may also be referred to as a virtual terminal (VT). The operational terminal 200 may include a display device such as a touch screen panel, and/or one or more buttons. The display device may be a display such as a liquid crystal or an organic light-emitting diode (OLED), for example. By manipulating the operational terminal 200, the user can perform various manipulations, such as switching ON/OFF the self-driving mode, setting a target path, recording or editing a map, and switching ON/OFF the implement 300. At least some of these manipulations can also be realized by manipulating the operation switches 210. The operational terminal 200 may be configured to be detachable from the work vehicle 100. A user who is remote from the work vehicle 100 may manipulate the detached operational terminal 200 to control the operation of the work vehicle 100. Instead of the operational terminal 200, the user may manipulate a smartphone, a tablet computer, or a personal computer (PC), or other apparatuses on which necessary application software is installed, to control the operation of the work vehicle 100. The terminal 400 may cover the functionality of the operational terminal 200.

The drive device 340 in the implement 300 performs a necessary operation for the implement 300 to perform a predetermined task. The drive device 340 includes devices adapted to the intended use of the implement 300, e.g., a pump, a hydraulic device, an electric motor, or a pump. The controller 380 controls the operation of the drive device 340. In response to a signal that is transmitted from the work vehicle 100 via the communicator 390, the controller 380 causes the drive device 340 to perform various operations. Moreover, a signal that is in accordance with the state of the implement 300 may be transmitted from the communicator 390 to the work vehicle 100.

The terminal 400 may be a mobile apparatus such as a smartphone, a tablet computer, or a remote control, for example. Based on signals transmitted from the multiple GNSS satellites, the GNSS receiver 410 in the terminal 400 outputs data including information of the position of the terminal 400. The GNSS receiver 410 may output data of an NMEA format, for example. The input device 420 is a device that accepts input operations from the user, and may include one or more buttons or switches. The display device 430 may be a display such as a liquid crystal or an OLED, for example. The input device 420 and the display device 430 may be implemented as a touch screen panel. The storage device 450 may include a semiconductor storage medium such as a flash memory, for example. The storage device 450 stores a computer program(s) to be executed by the processor 460 and various data that is generated by the processor 460. By executing the computer program(s) stored in the storage device 450, the processor 460 performs the following operation. In response to a hailing operation made by the user by using the input device 420, the processor 460 transmits a hailing signal including positional information of the terminal 400 from the communicator 490 to the communicator 190 of the work vehicle 100. The positional information of the terminal 400 is generated based on a signal that is output from the GNSS receiver 410.

Figure 10:
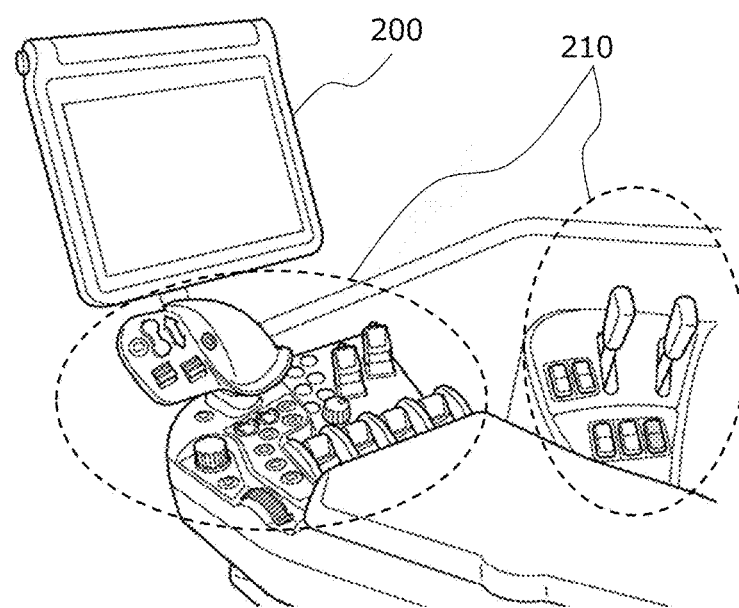
FIG. 10 is a schematic diagram showing an example of an operational terminal and operation switches.
Figure 11:
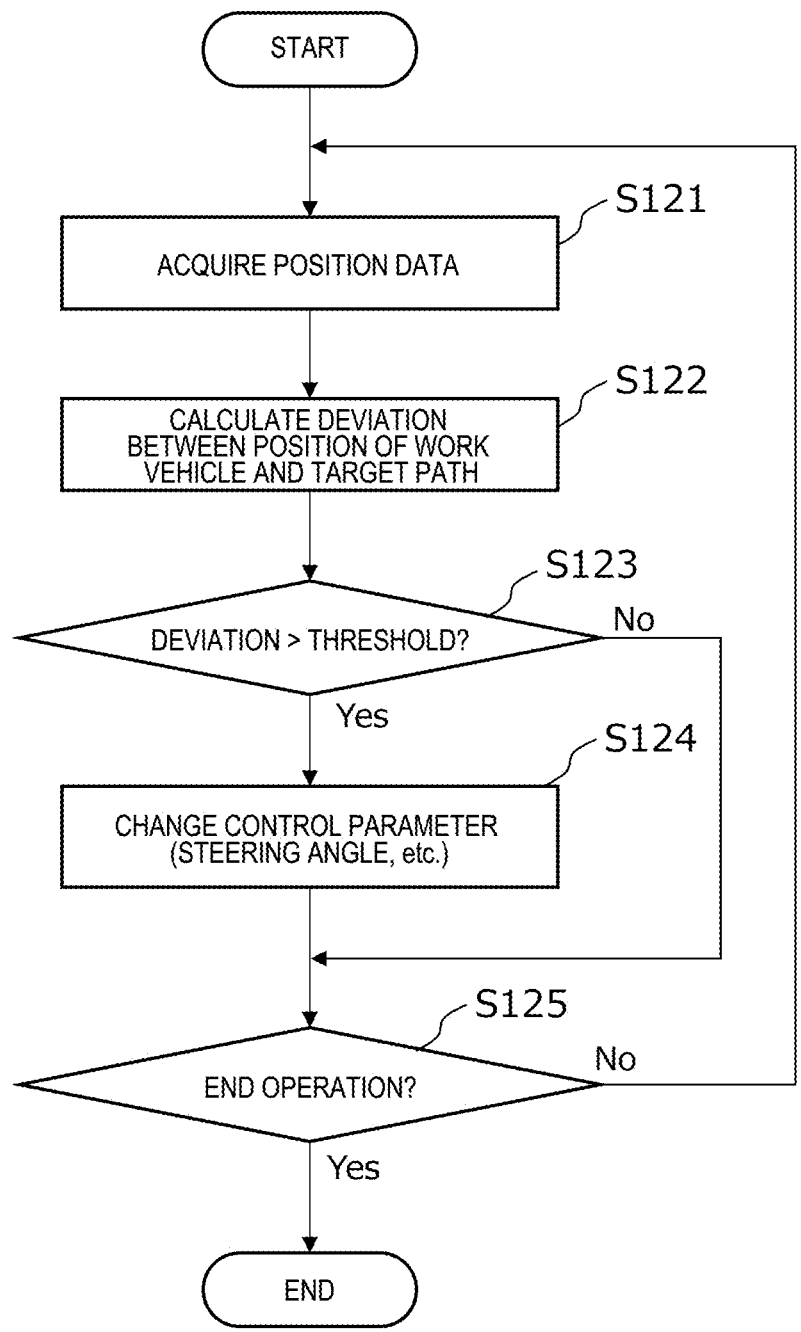
FIG. 11 is a flowchart showing an example operation of steering control during self-driving.

FIG. 10 is a schematic diagram showing an example of the operational terminal 200 and operation switches 210 to be provided in the cabin 105. In the cabin 105, switches 210, which are a multitude of switches that are manipulable to the user, are disposed. The operation switches 210 may include, for example, a switch to select the gear shift as to a main gear shift or a range gear shift, a switch to switch between a self-driving mode and a manual driving mode, a switch to switch between forward travel and backward travel, a switch to raise or lower the implement 300, and the like. In the case where the work vehicle 100 only performs unmanned driving, and lacks human driving functionality, the work vehicle 100 does not need to include the operation switches 210.

FIGS. 5A and 5B are diagrams schematically showing an example of a work vehicle 100 automatically traveling along a target path in a field. In these examples, the field includes a work area (plot PL1) in which the work vehicle 100 performs a task by using the implement 300, and avenues (margin area) M that are located near the outer peripheral edge of the field. The user may designate which regions on the map of the field would correspond to the work area (plot PL1) and the avenues M in advance. The target path in this example includes a plurality of parallel main paths PP and a plurality of turning paths TP interconnecting the plurality of main paths PP. The main paths PP are located in the work area (plot PL1), whereas the turning paths TP are located in the margin areas M. Although each main path PP in FIGS. 5A and 5B is illustrated as a linear path, each main path PP may also include a curved portion(s). Each main path PP within a trellis is designated by an entrance point EN and an exit point EP. Broken lines in FIGS. 5A and 5B depict the areas of vegetation V or trellis structures T, as shown in FIG. 1A for example. The areas of vegetation V or trellis structures T may be previously set and recorded in the storage device 170, or may be set and recorded as the user manipulates the operational terminal 200. Alternatively, the areas of vegetation V or trellis structures T may be automatically recognized and recorded in real-time by the various sensors of the work vehicle 100 when self-driving. The target path or the Global Path Planning is generated by the ECU 185 based on the user's manipulation, before self-driving is begun. The target path may be generated so as to cover the entire work area PL1 in the field, for example. Along the target path shown in FIGS. 5A and 5B, the work vehicle 100 automatically travels in repetitive reciprocations, from a beginning point of work (starting point SP) to an ending point of work (ending point EP). Note that the target path shown in FIGS. 5A and 5B are non-limiting examples, and the target path may be arbitrarily determined.

When the work vehicle 100 turns along each turning path TP, the controller 180 of the work vehicle 100 is configured or programmed to calculate judging conditions in accordance with "Judging Point 2" as shown in FIGS. 1 and 2. The control system 160 has functionality as a turning path management system to manage a sequence of operations to be executed during a turn in the turning path TP of the margin area M in step S110 shown in FIG. 2. The sequence of operations may include a field-out operation to be performed at the beginning of a turn and a field-in operation to be performed at the finish of a turn. The field-out operation may include at least one of the operations of raising the implement 300 that is linked to the work vehicle 100, suspending output of motive power to the implement 300, disabling the locking differential function of the work vehicle 100, switching from the two-wheel drive mode to the four-wheel drive mode, and lowering the engine revolutions of the work vehicle 100, for example. The field-in operation may include at least one of the operations of raising the implement 300, switching into reverse gear transmission, starting the locking differential function, switching from the four-wheel drive mode to the two-wheel drive mode, and increasing the engine revolutions, for example.

During turns TP at the margin areas M, the controller 180 controls the operation of the work vehicle 100 and the implement 300 in accordance "Judging Point 2". This allows automatic turns at the margin areas M to be performed smoothly.

Hereinafter, with reference to FIGS. 12A to 12D, an example of steering control by the controller 180 will be described more specifically.

Figure 12A:
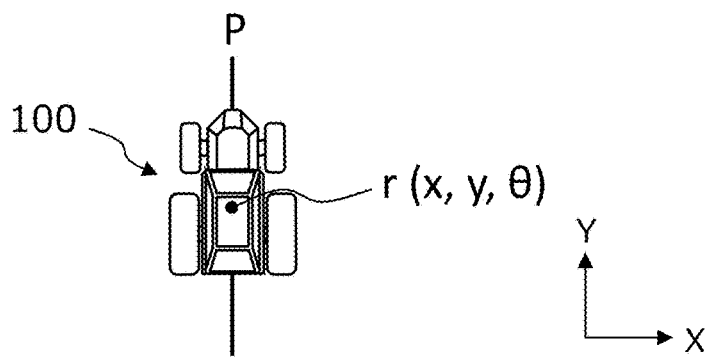
FIG. 12A is a diagram showing an example of a work vehicle that travels along a target path.
Figure 12B:
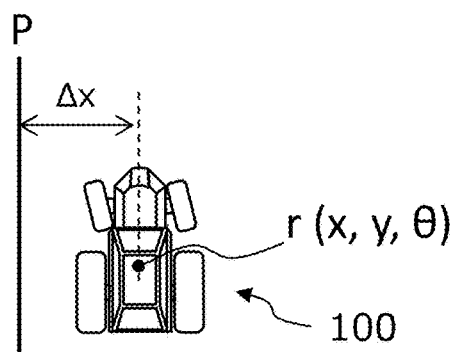
FIG. 12B is a diagram showing an example of a work vehicle at a position which is shifted rightward from the target path.
Figure 12C:
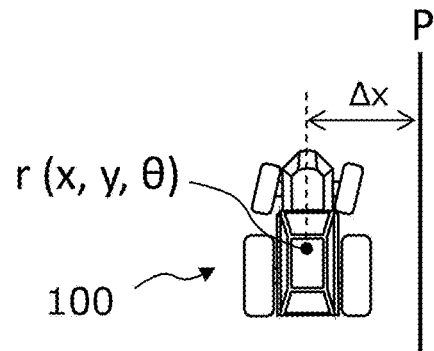
FIG. 12C is a diagram showing an example of a work vehicle at a position which is shifted leftward from the target path.
Figure 12D:
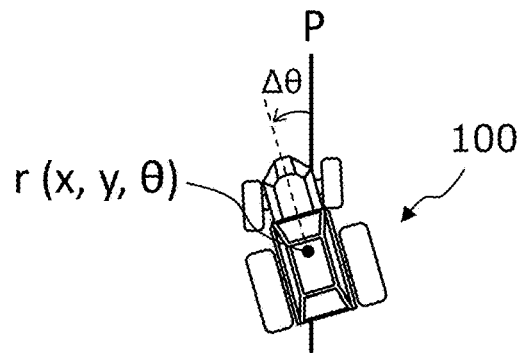
FIG. 12D is a diagram showing an example of a work vehicle which is oriented in an inclined direction with respect to the target path.

FIG. 12A is a diagram showing an example of a work vehicle 100 that travels along a target path P. FIG. 12B is a diagram showing an example of a work vehicle 100 at a position which is shifted rightward from the target path P. FIG. 12C is a diagram showing an example of a work vehicle 100 at a position which is shifted leftward from the target path P. FIG. 12D is a diagram showing an example of a work vehicle 100 which is oriented in an inclined direction with respect to the target path P. In these figures, the pose, i.e., the position and orientation, of the work vehicle 100 as measured by the positioning device 110 is expressed as r (x,y,θ). Herein, (x,y) are coordinates representing the position of a reference point on the work vehicle 100, in an XY coordinate system which is a two-dimensional coordinate system being fixed to the globe. In the examples shown in FIGS. 12A to 12D, the reference point on the work vehicle 100 is at a position on the cabin where a GNSS antenna is disposed, but the reference point may be at any arbitrary position. θ is an angle representing the measured orientation of the work vehicle 100. Although the target path P is shown parallel to the Y axis in the examples illustrated in these figures, generally speaking, the target path P may not necessarily be parallel to the Y axis.

As shown in FIG. 12A, in the case where the position and orientation of the work vehicle 100 are not deviated from the target path P, the controller 180 maintains the steering angle and speed of the work vehicle 100 without changing them.

As shown in FIG. 12B, when the position of the work vehicle 100 is shifted rightward from the target path P, the controller 180 changes the steering angle so that the traveling direction of the work vehicle 100 will be inclined leftward, thus bringing the work vehicle 100 closer to the path P. Herein, not only the steering angle but also the speed may be changed. The magnitude of the steering angle may be adjusted in accordance with the magnitude of a positional deviation Δx, for example.

As shown in FIG. 12C, when the position of the work vehicle 100 is shifted leftward from the target path P, the controller 180 changes the steering angle so that the traveling direction of the work vehicle 100 will be inclined rightward, thus bringing the work vehicle 100 closer to the path P. In this case, too, not only the steering angle but also the speed may be changed. The amount of change of the steering angle may be adjusted in accordance with the magnitude of the positional deviation Δx, for example.

As shown in FIG. 12D, in the case where the position of the work vehicle 100 is not considerably deviated from the target path P but its orientation is nonetheless different from the direction of the target path P, the controller 180 changes the steering angle so that the directional deviation Δθ will become smaller. In this case, too, not only the steering angle but also the speed may be changed. The magnitude of the steering angle may be adjusted in accordance with the magnitudes of the positional deviation Δx and the directional deviation Δθ, for example. For instance, the amount of change of the steering angle (which is in accordance with the directional deviation Δθ) may be increased as the absolute value of the positional deviation Δx decreases. When the positional deviation Δx has a large absolute value, the steering angle will be changed greatly in order for the work vehicle 100 to return to the path P, so that the directional deviation 40 will inevitably have a large absolute value. Conversely, when the positional deviation Δx has a small absolute value, the directional deviation 40 needs to become closer to zero. Therefore, it may be advantageous to introduce a relatively large weight (i.e., control gain) for the directional deviation Δθ in determining the steering angle.

For the steering control and speed control of the work vehicle 100, control techniques such as PID control or MPC (Model Predictive Control) may be applied. Applying these control techniques will make for smoothness of the control of bringing the work vehicle 100 closer to the target path P.

Note that, when an obstacle is detected by one or more obstacle sensors 130 during travel, the controller 180 halts the work vehicle 100. Alternatively, when an obstacle is detected, the controller 180 may control the drive device 140 so as to avoid the obstacle.

Figure 13B:
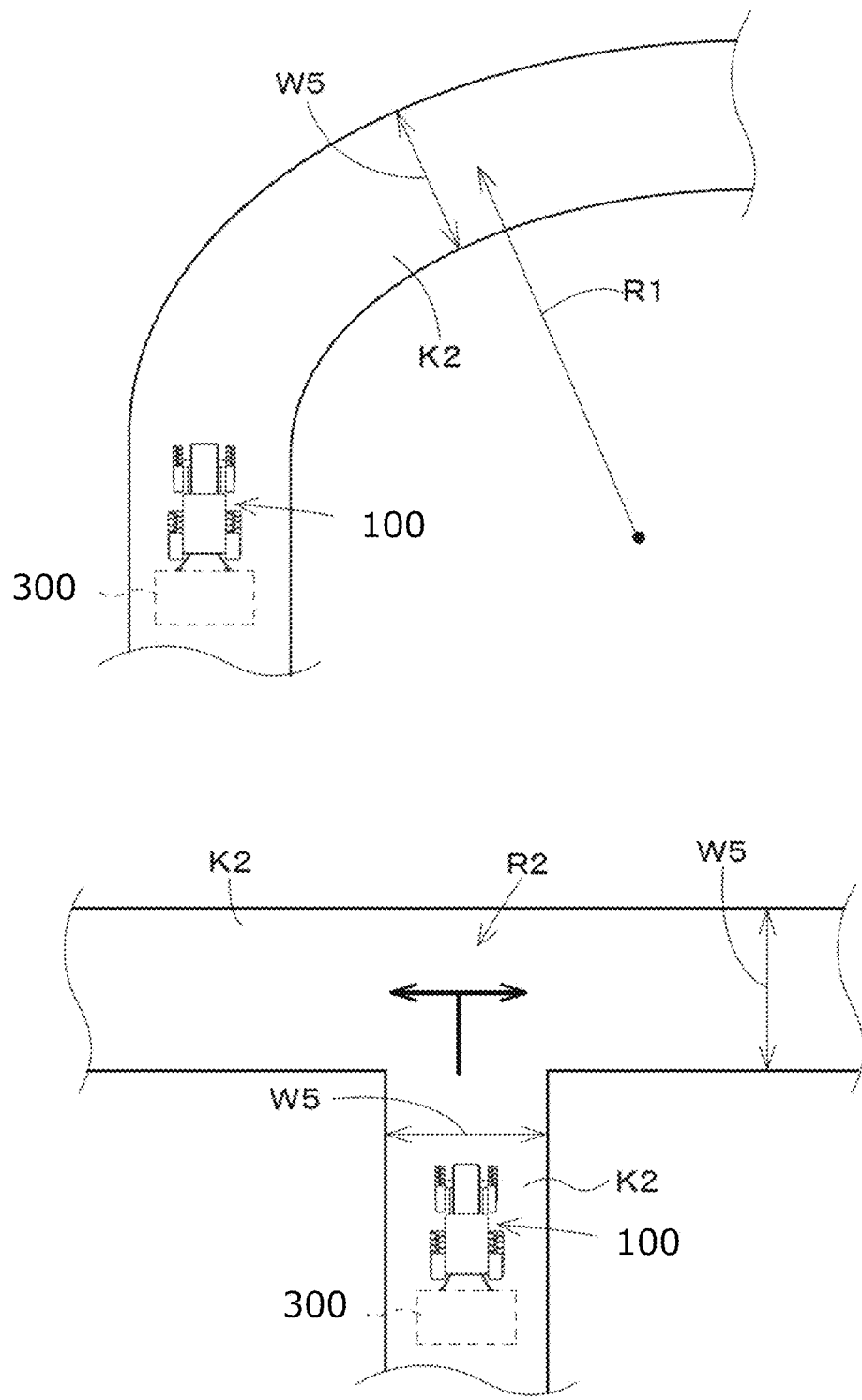
FIG. 13B illustrates field or trellis row conditions other than those in FIG. 13A.

The work vehicle 100 acquires (detects) field conditions while being autonomously driven along the travel path in the field area of plot PL1. Referring to FIGS. 13A and 13B, examples of the field or trellis conditions include an inclination (gradient) θ1 (herein referred to as "slope") of the ground surface K2 of the field (or row between trellises), a condition of irregular portions 101 on the ground surface K2 of the field, a width W11 of an obstacle 102 on the field K2, a height H1 of the obstacle 102, a width W5 of the row K2, a size R1 of a curve of the row K2, and a condition of an intersection R2. The obstacle 102 may any structure or a human.

More specifically, as illustrated in FIGS. 8 and 13A, according to preferred embodiments of the present invention, the controller 180 or monitor 186 detects the inclination θ1 of the ground surface K2 in front of (or in the rear of) the work vehicle 100 in the moving direction based on, for example, an image of a region in front of the work vehicle 100 captured by the camera 120, obstacle sensor 130, and/or scan data obtained by the LiDAR sensor 135. Alternatively, the inertial measurement unit (IMU) 115 may detect the inclination θ1 of the ground surface K2 along which the work vehicle 100 is being driven based on a pitch angle. The inertial measurement unit 115 enables detection of, for example, a roll angle, a pitch angle, and a yaw angle of the vehicle 100 by using an acceleration sensor and a gyroscope sensor, and the vehicle position can be corrected by using the detected roll angle, pitch angle, and yaw angle of the vehicle's body.

The controller 180 or sensor monitor 186 also detects a width W10 of each irregular portion 101 in front of the work vehicle 100 in the moving direction, a length L10 of the irregular portion 101, a depth F10 of the irregular portion 101, and a position of the irregular portion 101 on the ground surface K2 based on, for example, the captured image or the scan data.

The controller 180 or sensor monitor 186 detects the width W11 of the structure 102 in front of or in the rear of the work vehicle 100 in the moving direction and the height H1 of the structure 102 based on, for example, the captured image or the scan data. The monitor 186 may have data of profile of the structure 102 (profile data) and determine the type of the structure 102 by performing a matching process in which the shape represented by the profile data is compared with the shape of the structure 102 extracted from the captured image or the scan data. The type of the structure 102 may also be determined by comparing features of the structure 102 extracted from the captured image or the scan data with features of the structure 102 based on the profile data.

Referring to FIG. 13B, the monitor 186 detects the width (trellis row width) W5 of the ground surface K2 in front of or the rear of the work vehicle 100 in the moving direction, the size R1 of the curve of the trellis row width in the path of the ground surface ground K2, and the intersection R2 of the avenue or margin area of the ground surface K2 based on, for example, the captured image or the scan data. Referring to FIG. 13B and FIG. 1A, the intersection R2 may correspond to an intersection between one of the rows R1-R4 and the margin area M. With regard to the size R1 of the curve of the ground surface K2 and the intersection R2 of the ground surface K2, the controller 180, the terminal 400, etc., may refer to an agricultural field map MP1 as shown, for example, in FIG. 5A or 5B and estimate the size R1 of the curve and the condition of the intersection R2 of the ground surface K2 displayed on the agricultural field map MP1.

The above-described method for detecting the field conditions is an example, and the method is not limited.

Details of Judging Point 1

FIG. 3A shows the details of the conditions in Judging Point 1 in accordance with a preferred embodiment of the present invention. The items of Judging Point 1 are available information before driving (e.g., before the vehicle starts a traveling route or before a global path planning process is executed). In a preferred embodiment of the present invention, the information of the items listed in the Details of Judging Point 1 may be obtained using the input data entered by the user at a device terminal, information from a computer server, information from internet map sources such as Google Maps (registered trademark), or from other stable sources of information. Referring to FIGS. 3A and 3B, the specific conditions of Judging Point 1 will be described as follows.

User Selects the Function ON/OFF

Regarding the item, User selects the function ON/OFF, if the User sets the function to be ON, then entering the Trellis is set to YES. If the User sets the function to be OFF, then entering the trellis will be set to NO.

Type of Implement

Regarding the item, Type of Implement, if the implement has a tire or tires, (e.g., like a trailer type), then entering the trellis will be set to NO. If the implement does not have any tires, then entering the trellis will be set to YES. For example, during turning, an implement without tires may be raised by a three point (3P) hitch, included in the linkage device 108 as shown in FIGS. 14A and 14B, for example. On the other hand, an implement with tires, as shown in FIG. 14C, for example, is not raised by a three point (3P) hitch. In some situations it may be difficult to control the direction and x-y position of the implement having tires when the tractor is traveling backwards and turning. Thus, in a preferred embodiment of the present invention, only the implements without tires should be allowed to reverse into between trellises. FIGS. 14A and 14B shows examples of an implement 300 without wheels. FIG. 14C shows an example of an implement 300 with wheels.

Type of Implement (Length)

In a preferred embodiment of the present invention, regarding the item, Type of Implement (length), if the length L of the implement is less than the length A of the tractor, then entering the trellis will be set to YES. There may be a risk of the tractor reversing into and entering the trellises. A long length L of the implement increases the risk of entering the trellis. Thus, in a preferred embodiment of the present invention, if the length L of the implement is greater than or equal to the length A of the tractor, then entering the trellis will be set to NO. A short length of L has a small risk of entering the trellis. When the length of the implement L is shorter, the collision risk of entering the trellises is smaller. Thus, in a preferred embodiment of the present invention, the function of entering the trellises is set to "YES" when $L<A$.

However, in another aspect according to a preferred embodiment of the present invention, it is reasonable to consider a situation in which the implement is longer than the tractor length, in which more space to reverse and make the turn is required, and therefore reversing into the row between trellises may be helpful if there is sufficient area to make the turning and reversing maneuvers. Therefore, an additional condition includes entering the trellises being set to YES when $W_A<L+A$ is satisfied, $W_A$ being the width of the avenue or margin space M as shown in FIGS. 1A and 3. If L is longer than A and there is enough space to reverse, the tractor avoids entering the trellis as much as possible. If A+L is longer than $W_A$, then entering the trellises is allowed because there is less space to reverse.

Type of Implement (Center Line)

Regarding the item, Type of Implement (center line), if the center line of the tractor and the implement is almost or substantially the same or equal to each other, then entering the trellis is set to YES. An example of such a case is shown in FIG. 14C, in which the position of the centerline P40 of the tractor 100 is the same as the position of the center line P30 of the implement 300.

Figure 14D:
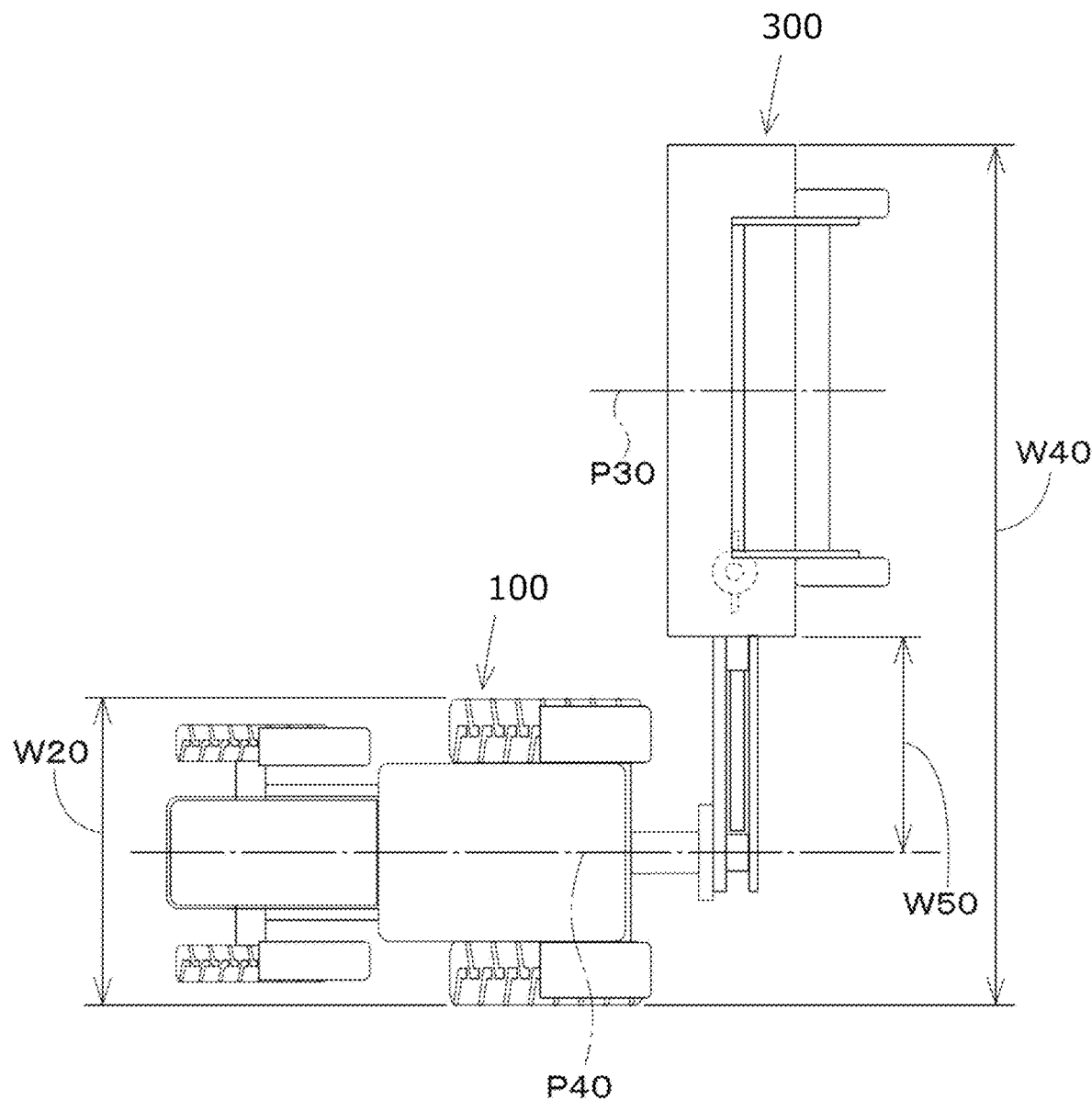
FIG. 14D illustrates an example of an implement with a centerline that is offset from a centerline of the work vehicle.

If the center line of the tractor and the implement are not the same, e.g., if the implement is a harvester and going over the next trellis, it would be very difficult for the tractor to enter the opposite trellis during turning, so this function would be set to NO. An example of is shown in FIG. 14D in which the centerline P40 of the tractor 100 is not the same as the center line P30 of the implement 300.

Trellis in the Adjacent Area/Adjacent Area is Field

Regarding the items, Trellis in the adjacent area and Adjacent area is field, these would be one of the first assumed points of whether or not a trellis is in the adjacent area. When the tractor is performing the turn, and the opposite side is a trellis or a field, the function would be ON (Enter Trellis set to YES). If the opposite side is a road, a house, or other obstacle, the function would be OFF (Enter Trellis set to NO). In a preferred embodiment of the present invention, the information of the items Trellis in the adjacent area and Adjacent area is field may be obtained using the input data entered by the user at a device terminal, information from map data pre-stored in a navigation system that is linked to the vehicle control system, Google Maps (registered trademark), or from other stable sources of information. For example, geographical data can be collected to generate maps of an environment by flying remote control drones equipped with cameras or by running vehicles in advance around a vineyard or farmland.

Trellis Row Width Vs. Tractor+Implement Width

Regarding the item, Trellis width vs. Tractor+Implement width, as shown in FIGS. 3A and 3B, the trellis width W1 is compared to the Tractor+Implement width A1. If the trellis width W1 is greater than the Tractor+Implement width A1, then there is sufficient space for the Tractor and Implement to enter the trellis and therefore the function is set to ON (Enter Trellis YES). Otherwise, if the trellis width W1 is equal to or less than the Tractor+Implement width A1, then there is insufficient space for the Tractor and Implement to enter the trellis and therefore the function is set to OFF (Enter Trellis NO).

In a preferred embodiment of the prevent invention, the width W1 of the row between trellises may be measured edge to edge, as shown in FIG. 3B. That is, the width W1 is measured from the edge of one vine to the edge of another vine as shown in FIG. 3B.

However, it may be difficult to obtain the exact width of the edge to edge (between the edges of each vegetation V), since there may be varying degrees of how large or bushy each vegetation V as shown in FIG. 1A is compared to one another. Thus, in an alternative embodiment of the present invention, it is preferable that the users manually input the width W2 between pole to pole as "trellis width" (i.e., from midline to midline of each trellis T as shown in FIG. 3B). In this case, "pole" means the same as the center of the vine.

Slope of the Adjacent Field

Regarding the item, Slope of the adjacent field, if the Slope of the opposite (adjacent) field (area of PL2) is less than a predetermined value [NA] (e.g., the slope is small or the ground is flat), then the function of Entering the trellis is set to YES. If the slope is greater than or equal to the predetermined value [NA] that is a threshold or upper limit value slope that the vehicle is incapable of traversing (e.g., the grounds of the adjacent field have a steep hard slope and/or are not very smooth or flat), the function of entering the trellis is set to NO. In a preferred embodiment of the present invention, the predetermined value [NA] can be set to an absolute value. In this case, the "slope" may correspond to either an uphill or a downhill environment.

Work Plan in Adjacent Field

Regarding the item, Work plan in adjacent field, if the tractor performing autonomous driving is in one field and the other opposite (adjacent) field includes persons such as working farmers or employees harvesting by hand, the machine should not enter that trellis to disturb or interrupt the work plan going on in that trellis. Thus, if there is a work plan scheduled to occur in the adjacent field, the tractor will not cross to the opposite side.

In a preferred embodiment of the present invention, all of the items that establish the criteria or conditions for Judging Point 1 are available information before driving. More specifically, the Judging Point 1 is determined based on information that is obtainable from a computer server or stored in the vehicle before the vehicle starts driving. In the Judging Point 1, the ON/OFF determination is made based on the user's intention and/or the information that the vehicle has in advance.

For example, the information regarding the Type of Implement, may be provided to the controller in various ways. One possible way is that the data can be input through ISOBUS through the tractor. Alternatively, if the user or manager knows the type of implement they own, they could input that data through an application (app) or web browser app on the terminal device 400, a terminal 200 provided inside or on the tractor, or a website with a dashboard for the application.

In a preferred embodiment of the present invention, the available information before driving including the items regarding the Type of Implement for Judging Point 1, can be input manually by a user at a user interface on the terminal 400. Alternatively, the data can be input through ISOBUS. ISOBUS is a connective technology that allows information to be communicated between the tractor and the implement.

In a preferred embodiment of the present invention, the available information before driving including the items regarding information about the trellis in the adjacent area or information about the adjacent field, this information may be collected by being entered by the user in an app or obtained by satellite images provided by internet resources. For example, regarding the Trellis row width W1, satellite images can be used to calculate a distance between two points, the two points being the edges or ends of each trellis in the width direction. Such information available before driving may be obtained using the input data entered by the user at a device terminal, information from map data pre-stored in a navigation system that is linked to the vehicle control system, Google Maps (registered trademark), or from other stable sources of information. For example, environmental or geographical data can be collected to generate maps by flying remote control drones equipped with cameras or by running vehicles in advance around a vineyard or farmland.

In preferred embodiments of the present invention, a combination of any one or more or all of the items can be used to determine Judging Point 1 (whether or not the function of entering the Trellis is ON or OFF). For example, in a preferred embodiment of the present invention, Judging Point 1 can be based solely on Item 1 (User select the function ON/OFF). In another preferred embodiment of the present invention, Judging Point 1 can be based solely on Item 1 and/or Item 2 (Type of Implement), etc.

Figure 4C:
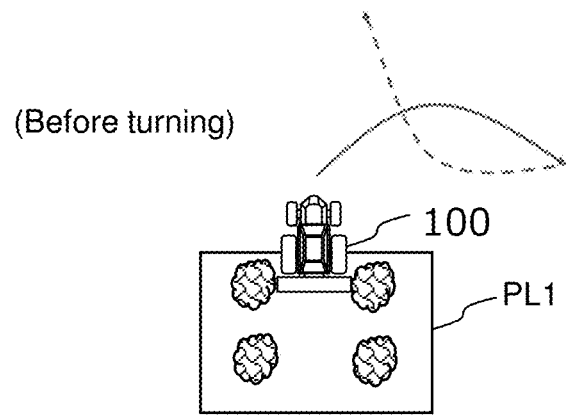
FIGS. 4C and 4D show moments in time before turning and during turning between rows of trellises.
Figure 4D:
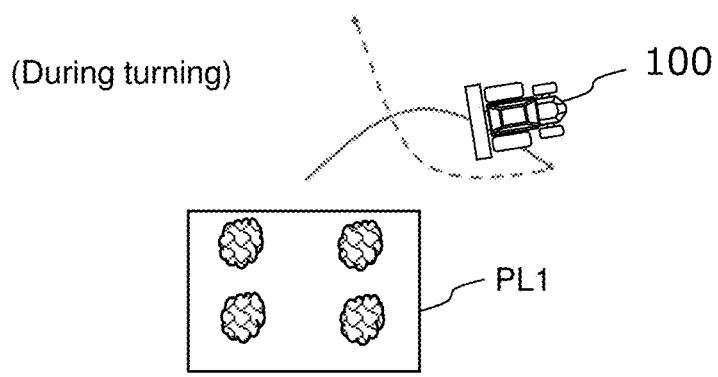

Referring to FIG. 2, at step S106, the controller determines if there is a trellis in the turning route, based on the same information as "Trellis in the adjacent area" under the Details of Judging point 1 as shown in FIG. 3A. The determination algorithm of the controller compares between the location data of the calculated local path referred to GPS and the location data of the "Trellis in the adjacent area" referred to GPS when the tractor determines that the tractor needs to switch backwards (switch into reverse). The timing of this determination of switching backward may be when the tractor switches from straight traveling to turning traveling, or during the tractor turning and updating the local path. The "Trellis in the adjacent area" condition can be based on the same information as the information under Judging Point 1 that may be updated from the start of driving through the timing of the determination of switching backward, or the information based on real-time information that is updated by LiDAR or other sensors scanning the environment around the tractor when the tractor switches from straight traveling to turning or during the tractor turning. If the system references the same type of information as Judging Point 1, the information referenced should at least be updated information. The main purpose of Judging Point 2 is to evaluate real-time information during the turning process. When the controller determines step S106 based on real-time information, the "real-time" depends on the timing when the local path indicates that the tractor will switch backwards (i.e., switch into reverse). As described above, the timing of "when" can be both of before the turning start at S105 and during turning. In a preferred embodiment of the present invention, the step of S106 is determined at the moment when the local path indicates it includes backward direction. The controller 180 has the location data of the "Trellis adjacent area" and the location data of the future trajectory of the turning local path. The controller 180 compares the location data of the "Trellis adjacent area" and the location data of the future trajectory of the turning local path and determines whether the trajectory of the local path is in the adjacent Trellis or not. FIG. 4C shows a moment in time before turning, in which the controller recognizes and determines that the tractor will switch back into reverse since the path entering the trellis is more reasonable. FIG. 4D shows a moment in time during turning, in which the controller determines that the tractor will need to switch back into reverse. Step S106 can be performed at either of the moments in time shown in FIGS. 4C and 4D.

At step S106, if the controller determines that there is "NO" trellis in the turning route, then a geofence GF is set to the border of Area M at step S109 as shown in FIG. 1B. If the geofence GF is set at S109, the system controller prohibits the vehicle from entering the area past the geofence GF.

Details of Judging Point 2

FIG. 4A shows the details of Judging Point 2 at step S107 in accordance with a preferred embodiment of the present invention. Judging Point 2 is based on real-time information. The information used for Judging Point 2 may be obtained in real-time after the tractor has started driving or while the tractor performing autonomous driving (e.g., after the vehicle starts a traveling route or after the global path planning process is executed). The details of Judging Point 2 as shown in FIG. 4A are described below.

Trellis Training Type

Figure 16A:
FIG. 16A shows examples of I-Type trellis vine training.

Regarding Trellis training type, vineyard training types typically include I-type vineyard training and Y-type vineyard training. When the field is in proximity, the type of vineyard training can be determined by LIDAR, camera(s), and/or other sensors to detect what kind of training is used on the vines in that field. FIG. 16A shows examples of a trellis with I-type training. In a preferred embodiment of the present invention, if it is determined that trellises have I-type training, the function of entering between the trellises would set to Yes because there is sufficient space between the left and right side trellises of the vineyard.

Figure 16B:
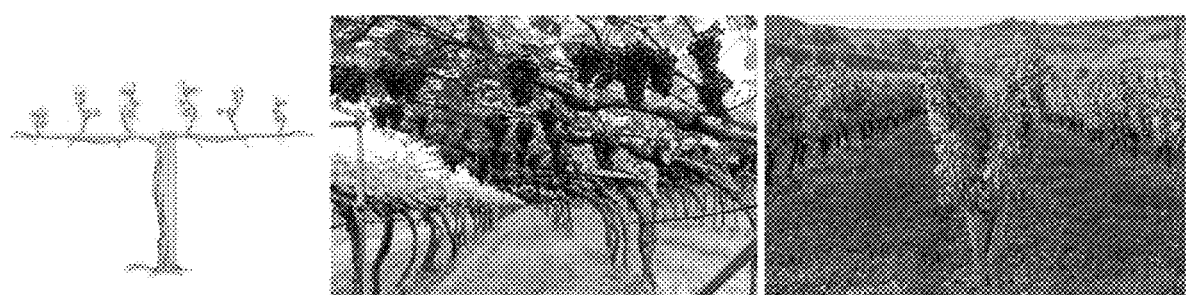
FIG. 16B shows examples of Y-Type trellis vine training.

However, as shown in FIG. 16B which shows examples of a trellis with Y-type training, Y-type training has a larger canopy area than that of I-type training. Although there may be a wider spacing in the lower area of the trellis, with respect to the upper area between adjacent trellises, there may a very narrow space between the left and right side trellises of the vineyard. The space between each trellis is restricted due to the larger canopy size. Thus, in a preferred embodiment of the present invention, if it is determined that trellises have Y-type training, then the function entering between the trellises could be set to be OFF (Enter Trellis: No).

The present invention is not limited to any specific types of training. Other vineyard trellis training methods can be used for detection.

Inflation Layer Value

An inflation layer value is compared to an upper limit threshold to determine whether or not the tractor should enter the trellis. The inflation layer is known to one of ordinary skill in the art and is further described below. The inflation layer is determined by a processor or an electronic computing unit supporting the agricultural machine (e.g., tractor). If the inflation layer is less than or equal to a predetermined upper limit threshold, then the agricultural machine will be allowed to enter the trellises (function is set to Enter Trellises: Yes). Otherwise, the function is set to OFF (Enter Trellises: No).

Trellis Row Width Vs. Tractor+Implement Width

The Tractor+Implement width A1 is compared to the Trellis row width W1 minus a value equal to double the inflation layer value (e.g., Inf×2). The value equal to double the inflation layer value accounts for the inflation layer on both sides of the trellis row. If the Tractor+Implement width A1 is less than the trellis row width W1 minus a value equal to double the inflation layer, then the agricultural machine will be allowed to enter the trellises (function is set to Enter Trellises: Yes). Otherwise, the function is set to OFF (Enter Trellises: No). Alternatively, if the trellis row width W1 is unknown or cannot be determined at the time, then a width W2 can be used instead of the width W1.

Number of Reverses

The "number of reverses" means the number of times reversing (or switching the gears or transmission into reverse) is engaged to make the turn. The values of N1, N2, and a are defined as follows:

N1: Number of reverses required when turning with trellis
N2: Number of reverses required when turning without trellis
α: Number of reverses set by the user In order for it to be reasonable or worth the risk of entering the trellises, N2 must be less than or equal to α, and the difference between N2 being the number of reverses required when turning without trellis minus N1 being the number of reverses required when turning with trellis must be greater than 1. For example, if the user sets α=3, then N2 must be equal to or less than 3 (=α), and N2 minus N1 must be greater than 1. If N2 is greater than a or N2 minus N1 is not greater than 1, then it is not worth it for the tractor to enter the trellises and therefore the function is set to Off (Enter Trellises: NO). Fundamentally, when the number of N2 is not so big, the benefits of efficiency are small at the risk of entering the trellis during turning. Like the above, when the difference between N2 and N1 is only 0 or 1, taking the risk of entering the trellis is unreasonable.

The computer or controller determines N1 and N2 by calculating the target route path based on real-time info and using the local planner. If the controller can calculate the full trajectory of the turning local path before starting the turn, the number of turnaround candidates N1 and N2 will be greater than 2. However, if the controller cannot calculate the trajectory including the number of reverses, N1 and N2 will be 1. In that case, this Judging item of entering the trellises is set to NO.

Slope of the Adjacent Field

If the slope of the adjacent field is easy for the vehicle to traverse, such that the value of the slope is less than a threshold value [NA], then the function of entering the trellis will be set to YES. However, if the slope is too steep such that it is difficult or not possible for the vehicle to traverse, then the function would be set to NO. The slope of the adjacent field may be determined based on information detected in real time. In the case when the information is detected in real time, the controller calculates the slope of the adjacent trellis from the information detected by LiDAR sensors 135 or camera 120, and the information is corrected by the information of the IMU 115. The reason why correction by IMU is preferable is that the slope information from LiDAR sensors 135 is just relative information. Therefore, correction by the IMU 115 (current attitude of the tractor) helps for calculating absolute slope information.

It is not necessary that the slope information is detected in real time. In alternative embodiments, the slope information may be received from a server, or previously stored in the memory of a storage device 450 or entered by the user at the terminal 400.

Trellis Row Direction

Referring to FIG. 4B, the trellis row direction T1 is the same or substantially the same as the trellis row direction T2, then no steering management is needed when reversing into the opposite trellis since the tractor can reverse straight, and the tractor will be allowed to enter the opposite side trellis. If the trellis row direction T1 is substantially different from the trellis row direction T2, then it would be preferable to not allow the tractor to enter the opposite row trellis since steering management would be required. In order to determine the trellis row direction in real time, T1 is calculated from the 2D information of the trellis that the tractor is currently traveling, and T2 is calculated based on 2D information of the adjacent trellis which is detected during the tractor turning. "During" means from the moment that the tractor starts turn to the end of the turn. The 2D information of the adjacent trellis is calculated from the same method as traveling straight. An angle between the direction T1 and T2 is measured. If the angle is less than or equal to a predetermined value, then the judging of entering the trellis is set to YES. Otherwise, the judging of entering the trellis is set to NO.

Turning Place (Center or Edge of the Field)

FIG. 4B shows the regions and boundaries of the "center of the field" and "edge of the field." The boundary between the "center of the field" and "edge of the field" is indicated by the the dashed lines, more specifically, the field side edge of the trellis positioned outermost. If the tractor is currently located in the center of the field, then the judging of entering the trellis is set to YES. If the tractor is currently located at the edge of the field, then the judging of entering the trellis is set to NO.

Obstacles in the Trellis

If the controller detects that there are obstacles present in the opposite side trellis, then the Judging Point 2 does not allow tractor to the enter the opposite side trellises. Detection of obstacles in the opposite side trellis is described in further detail below.

Referring to FIG. 2, at step S107, if the controller determines that at least one of the conditions of the second group conditions of Judging Point 2 is not satisfied, then a geofence GF is set at S109 to the border of the margin area M as shown in FIG. 1B. If the geofence GF is set, the system controller prohibits the vehicle from entering the area past the geofence GF. If the enter trellis judging step at S107 is determined to be "YES" (e.g., all second group conditions of interest in of Judging Point 2 are satisfied), then the controller proceeds to step S110 and allows the vehicle to enter the adjacent area or the space between the trellises when the local path is created in the space between the trellises, as described above.

Figure 17:
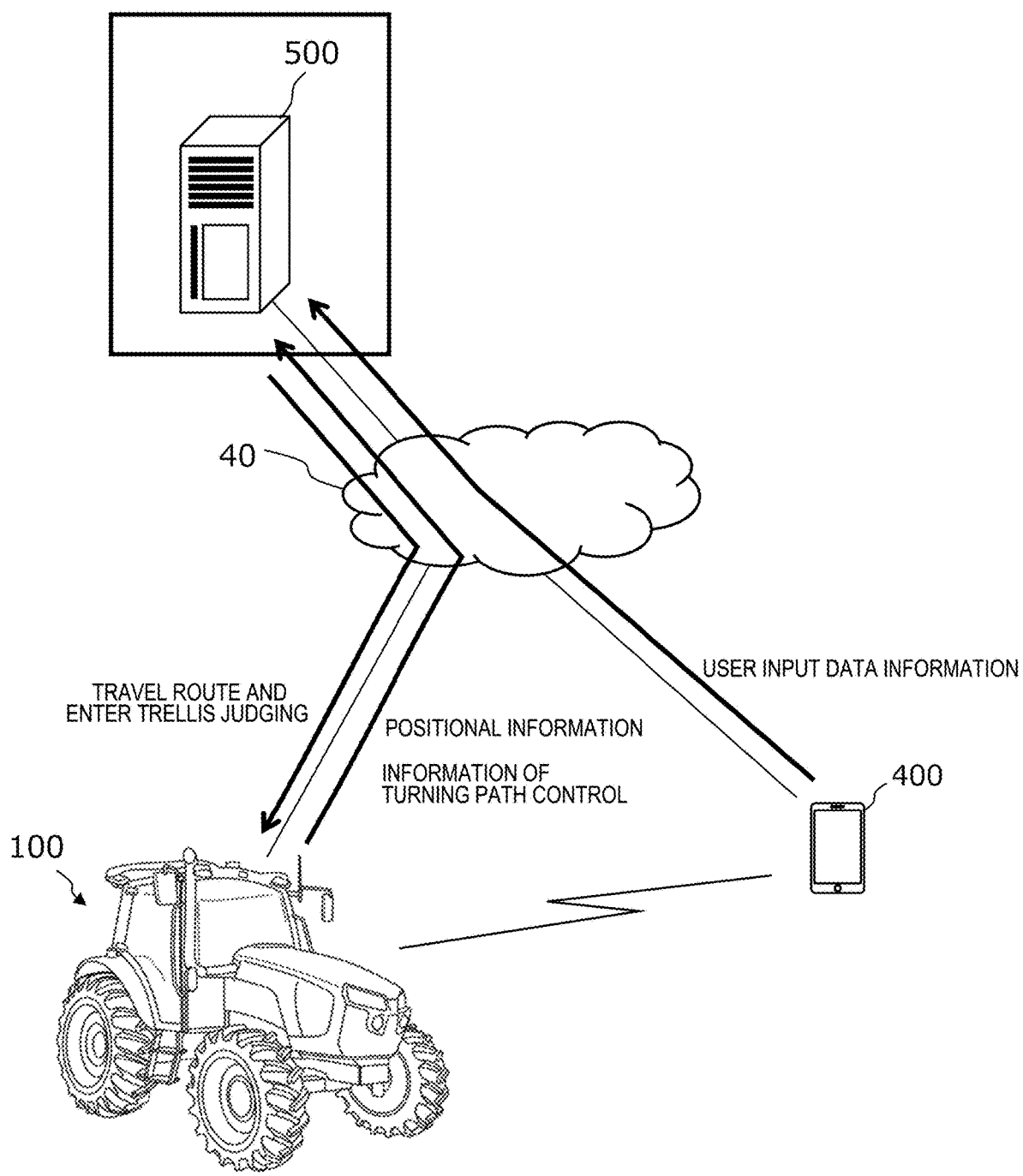
FIG. 17 is a diagram schematically showing an example configuration of a system in which a processing unit that communicates with the work vehicle via a network generates a travel route and performs the enter trellis judgment.

FIG. 17 is a diagram schematically showing the configuration of a system in which a processing unit 500 that communicates with the work vehicle 100 via the network 40 generates a travel route. In this example, rather than the controller 180 of the work vehicle 100, the external processing unit 500 generates a travel route, and transmits this information to the work vehicle 100. The processing unit 500 may be a computer such as a cloud server.

Figure 18:
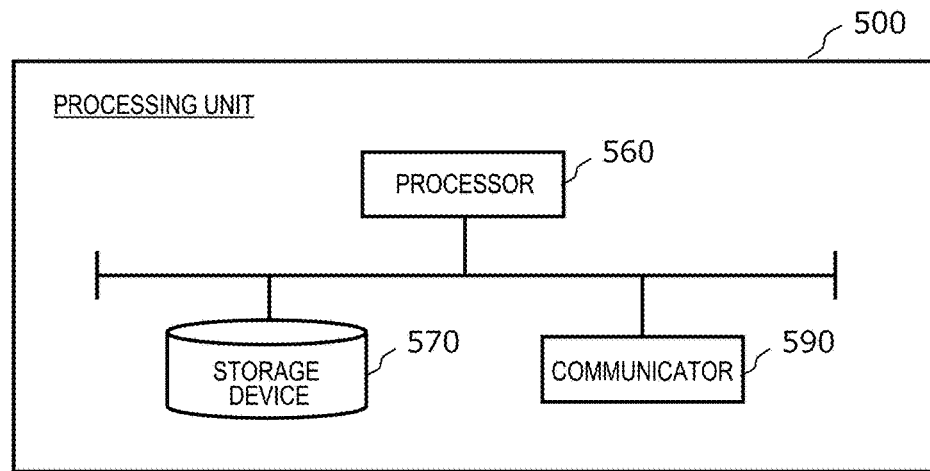
FIG. 18 is a block diagram showing an example configuration for the processing unit.

FIG. 18 is a block diagram showing the configuration of the processing unit 500. The processing unit 500 includes one or more processors 560, a storage device 570, and a communicator 590. The storage device 570 includes a memory in which a computer program to be executed by the processor 560 is stored. The communicator 590 exchanges signals with the communicator 190 of the work vehicle 100 and with the communicator 490 in the terminal 400. In this preferred embodiment, when the terminal 400 records schedules a new job for the work vehicle 100, the user input data information is transmitted to the processing unit 500 via the network 40. Based on the positional information of the work vehicle 100 and the user input data information, the processor 560 of the processing unit 500 generates a travel route and entering of the trellis judging by the methods described herein. The communicator 590 of the processing unit 500 transmits information of the travel route to the work vehicle 100. The work vehicle 100 moves along the travel route. The processor 560 of the processing unit 500 may generate not only the travel route, but also a target path for tasked travel. In that case, the work vehicle 100 may lack the ECU 185 for path generation purposes that is shown in FIG. 8.

Instead of the processing unit 500, the terminal 400 may generate the travel route. In that case, the terminal 400 acquires positional information of the work vehicle 100 and information of the turning path control from the work vehicle 100 or the processing unit 500. Based on the positional information of the work vehicle 100 and the information of the turning path control, the processor 460 of the terminal 400 generates a travel route. The terminal 400 transmits a signal including the information of the travel route to the work vehicle 100. Through such an operation, effects similar to those of each of the aforementioned preferred embodiments can be obtained.

In each of the above preferred embodiments, instead of the terminal 400, a monitoring terminal for monitoring the work vehicle 100 may perform the operation of controlling the work vehicle 100. Such a monitoring terminal may be provided at the home or the office of a user who monitors the work vehicle 100, for example.

Figure 19:
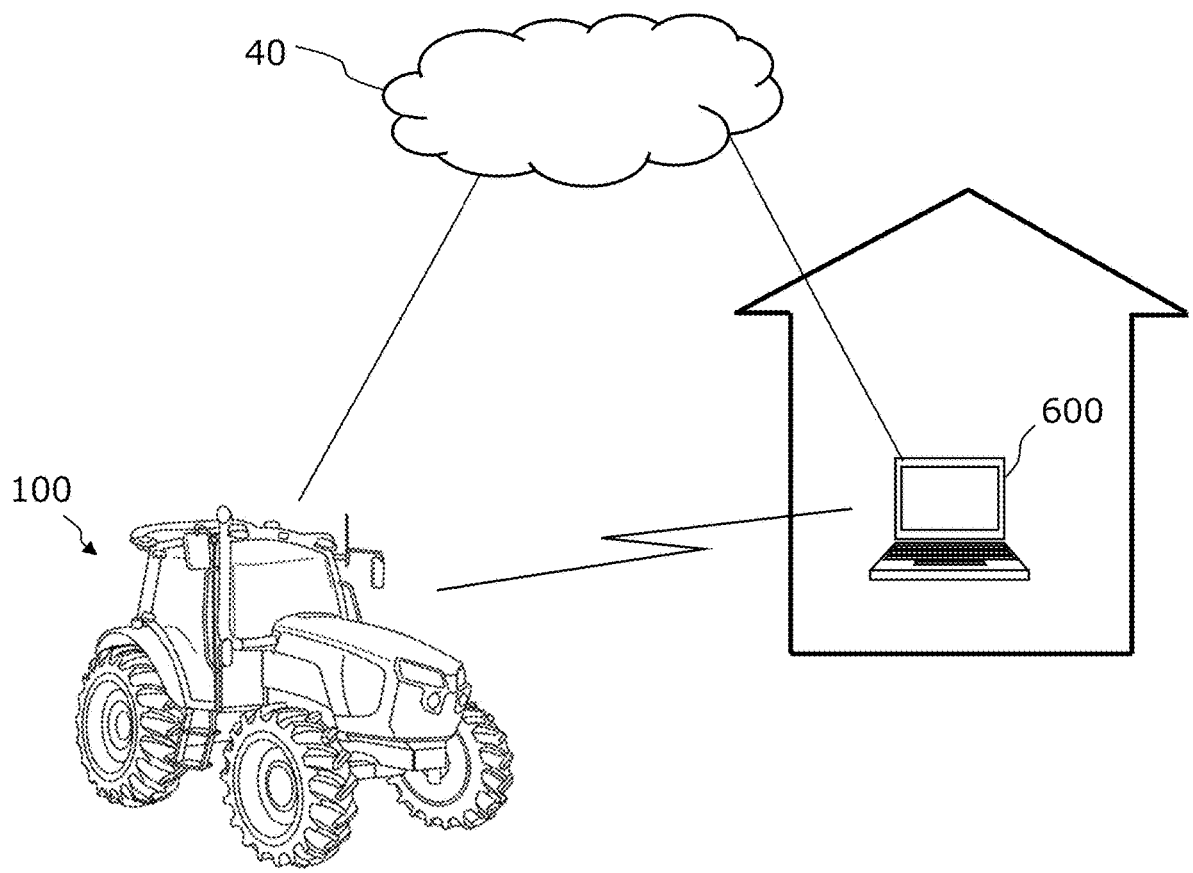
FIG. 19 is a diagram schematically showing an example of a system in which a monitoring terminal communicates with the work vehicle.

FIG. 19 is a diagram schematically showing an example of a system in which the monitoring terminal 600 controls the work vehicle 100. The monitoring terminal 600 is a laptop computer or a personal computer, for example, and is able to communicate with the work vehicle 100 via the network 40. Note that the monitoring terminal 600 may be a mobile computer such as a smartphone or a tablet computer. By manipulating the monitoring terminal 600, the user is able to control the work vehicle 100 along a desired route, as in each of the above preferred embodiments. The configuration of the monitoring terminal 600 is similar to the configuration of the terminal 400 shown in FIG. 8. In this example, the configuration of the work vehicle 100 is similar to that in the embodiment shown in FIG. 8. Instead of the ECU 185 in the controller 180 of the work vehicle 100, the monitoring terminal 600 may generate the travel route. In that case, the monitoring terminal 600 acquires positional information of the work vehicle 100. Based on the user input data, the positional information of the work vehicle 100, and the information of turning path control, the monitoring terminal 600 generates the travel route and the entering of the trellises judging, and transmits this information to the work vehicle 100.

Figure 20:
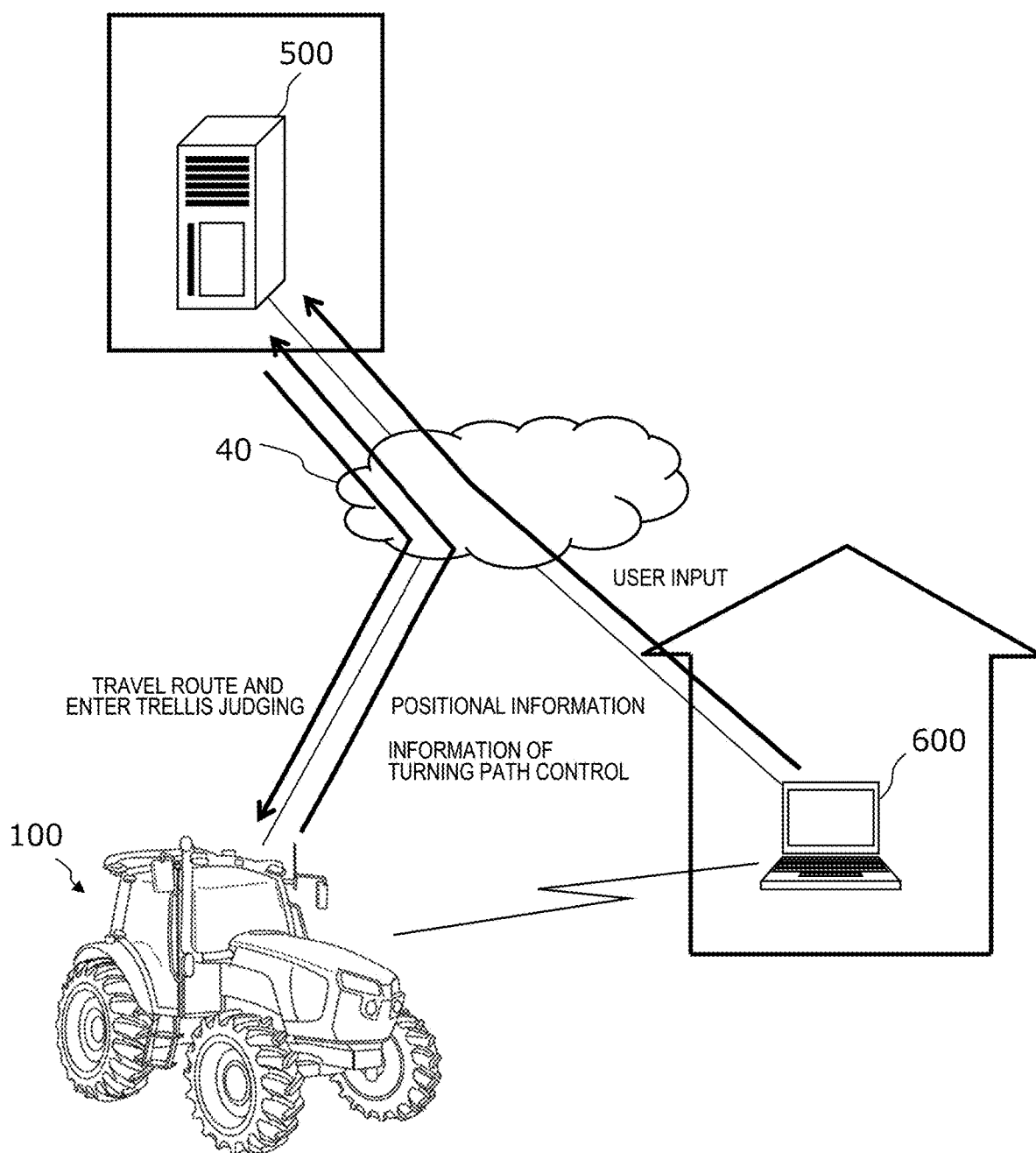
FIG. 20 is a diagram schematically showing another example of a system in which a monitoring terminal communicates with the work vehicle.

FIG. 20 is diagram schematically showing another example of a system in which the monitoring terminal 600 controls the work vehicle 100. This system corresponds to the system shown in FIG. 17 except that the terminal 400 is replaced by the monitoring terminal 600. In this system, the monitoring terminal 600 transmits user input data information to the processing unit 500 on the basis of a user's manipulation. The processing unit 500 generates a travel route similarly to the example of FIG. 17, and transmits it to the work vehicle 100. In this example, too, instead of the processing unit 500, the monitoring terminal 600 may generate the travel route, and transmit this information to the work vehicle 100.

FIG. 15 shows an example of an input screen provided at a user terminal that allows a user to enter input data before driving. As shown in FIG. 15, the user can select the Turning Arca Wider function to be ON or OFF, enter the type of implement (with or without tires), the dimensions of the implement 300 with respect to the tractor 100, and the work plan schedule. It will be appreciated that the input screen is not limited to any specific layout, and can be provided on multiple screen inputs in a web application or software application at the user terminal.

Figure 21:
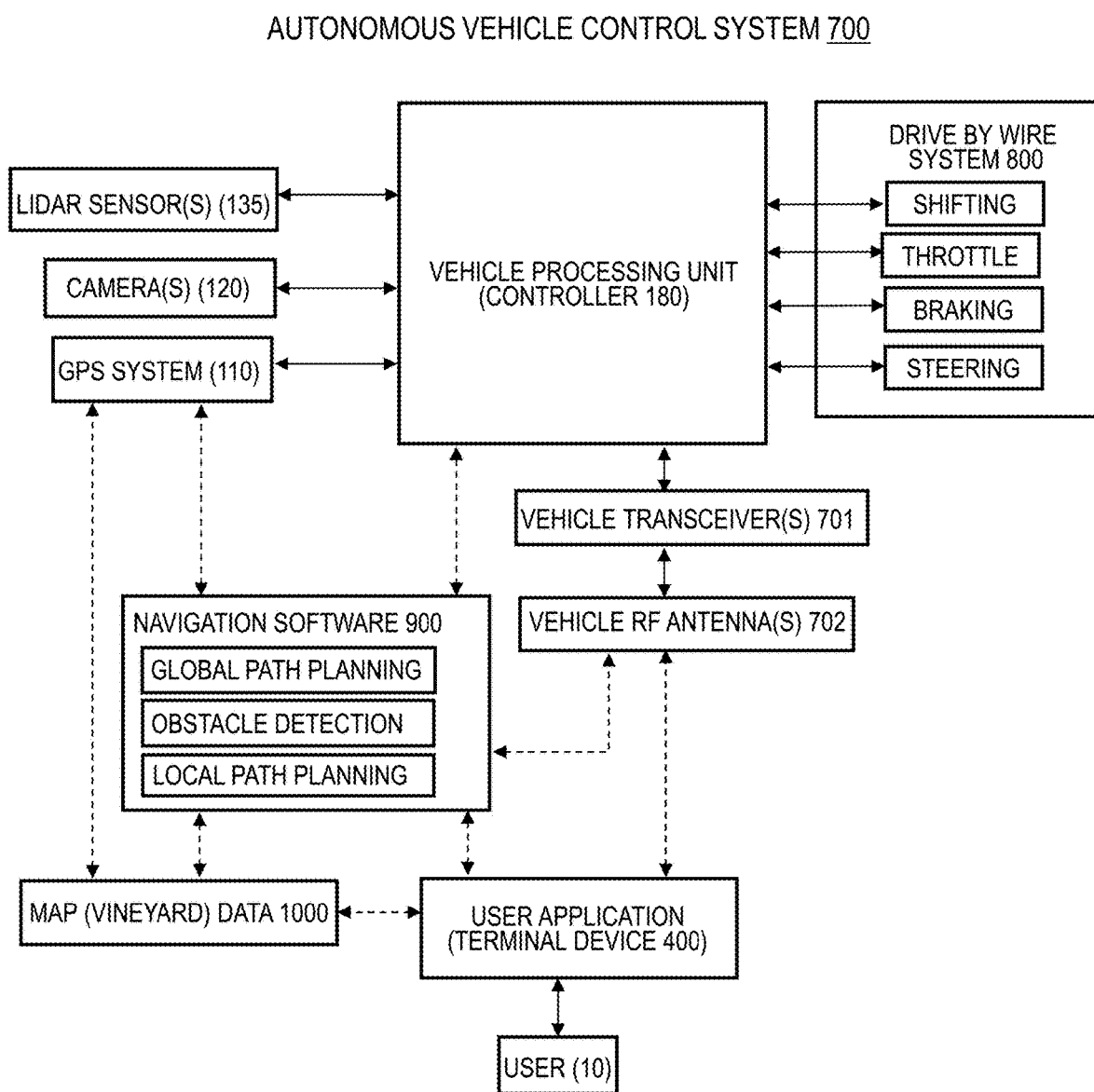
FIG. 21 is a block diagram showing an example configuration of an autonomous vehicle control system according to a preferred embodiment of the present invention.

FIG. 21 is a block diagram showing an example configuration of an autonomous work vehicle control system 700 for the work vehicle 100 according to a preferred embodiment of the present invention. In the present embodiment, the work vehicle 100 is configured as a tractor but it will be appreciated that the control system according to the present disclosure is not limited thereto. The tractor 100 is capable of self-driving in accordance with the features described above. According to the present preferred embodiment of the present invention, the work vehicle 100 can be a fully self-driving, driver-less farm vehicle which enables farmers to navigate through large fields autonomously via a user application, such as a web-based or mobile application through the terminal device 400. According to the present disclosure, the autonomous work vehicle control system 700 is primarily developed for vineyard operations but may be modified for other specific uses. The autonomous work vehicle control system 700 includes a combination of hardware and software components.

In the autonomous work vehicle control system 700, the tractor 100 is includes at least one or two LiDAR sensors 135, at least one camera 120, and a GPS system, such as the positioning device 110 described and shown in FIG. 8. For example, one LiDAR sensor may be mounted at the front of the vehicle 100, and another LiDAR sensor may be mounted at the rear of the vehicle 100. Alternatively, one LiDAR sensor module may be provided at top center of the vehicle and configured to detect a 360-degree field of view (FOV). The one or more LiDAR sensors are configured to perceive the environment e.g., obstacles, trellis etc. The GPS system 110 and the LiDAR sensors 135 provide information about the operating environment around the vehicle (tractor) 100. The one or more LiDAR sensors 135 are primarily used for obstacle detection and avoidance purposes. The LiDAR sensor(s) 135 are also used to indicate whether the tractor (vehicle) 100 is inside or outside of a trellis.

As shown in FIG. 21, the autonomous work vehicle control system 700 can include a Drive By Wire (DBW) system 800 that provides command inputs to the tractor 100. The Drive By Wire (DBW) 800 system is an electronic control system which provides shifting, throttle, braking, and steering control.

Referring to FIG. 21, the GPS system 110 localizes the tractor vehicle 100 in the environment. One or more cameras 120 provide live video feed from the tractor 100. A vehicle processing unit (e.g., controller 180) facilitates interfaces between the various sensors (LiDAR, GPS system, cameras), navigation software 900, and the DBW system 800. The navigation software 900 provides global path planning, obstacle detection, and local path planning. The navigation software 900 retrieves data from the GPS system 110, map (vineyard) data 1000, and the user application (terminal device 400). The navigation software 900 may be implemented on the computer/processing units provided at the vehicle 100 in conjunction with the controller 180, on a computer cloud server, the terminal device 400, or any combination of them. The map data 1000 may be obtained from a computer server, a cloud server, or other stable sources of information described herein. The user application receives commands and input data from the user 10 via the terminal device 400, which can then be provided to the map (vineyard) data 1000, the navigation software 900, and/or communication devices mounted on the vehicle 100 such as vehicle RF antenna(s) 702 and transceiver(s) 701. Any number of vehicle transceivers 701 and RF antennas 702 can be provided on the vehicle 100 to provide wireless communication using known methods, standards, and/or protocols.

Figure 22:
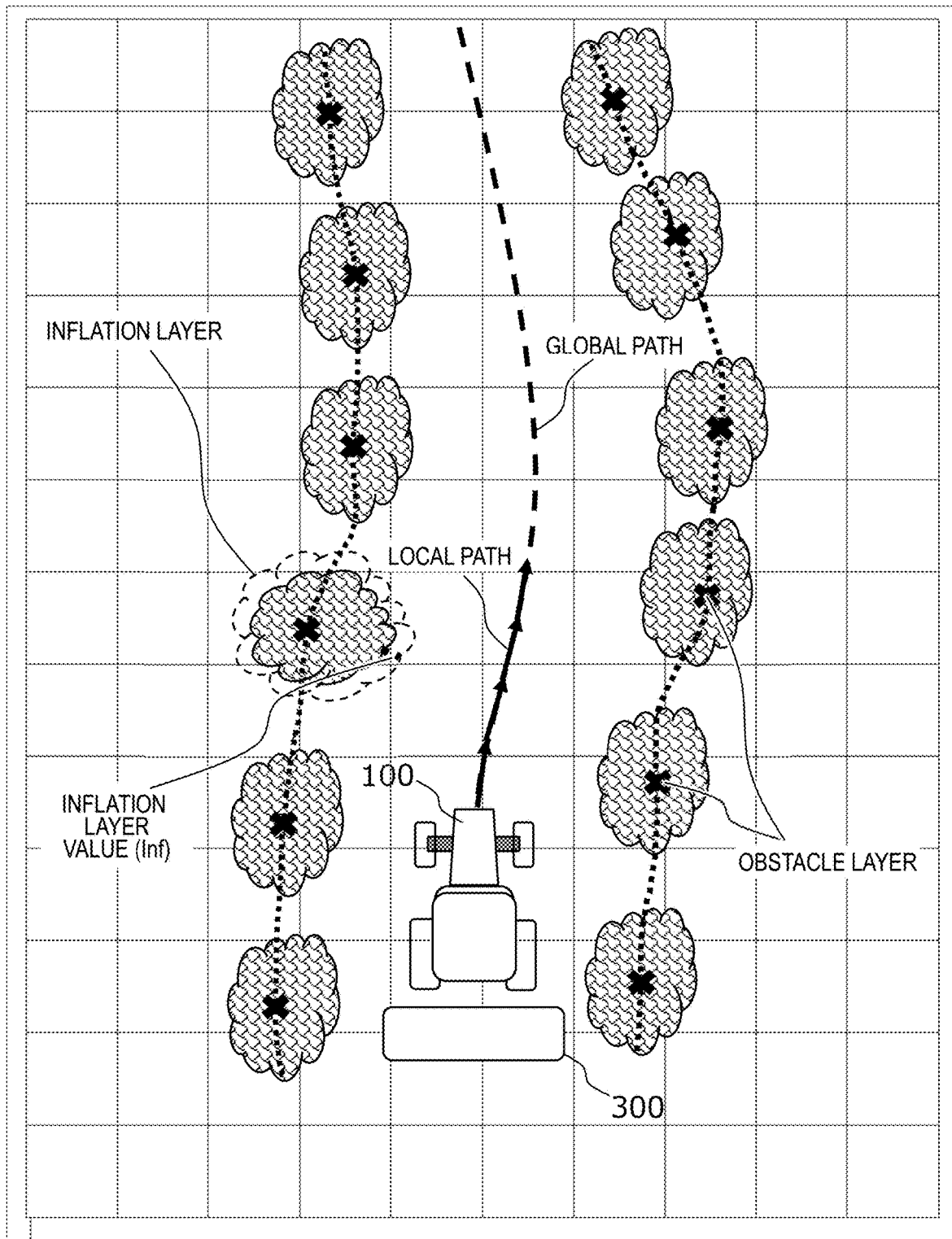
FIG. 22 shows an exemplarily visualization of navigation paths of a work vehicle traversing a row between trellises according to a preferred embodiment of the present invention.

FIG. 22 shows an exemplarily visualization of navigation paths of a work vehicle traversing a row between trellises. As shown in FIG. 22, a global path is planned and created based on the map data 1000 and user input data at the user application. For example, a global path may be planned in accordance with the travel routes TR shown in FIG. 5A or 5B. A local path is generated and modified in real-time based on the various sensors (e.g., LiDAR sensors, cameras) mounted on the vehicle 100 and obstacle detection that is processed by the controller 180. As shown in FIG. 22, an obstacle layer indicates a location of an obstacle or landmark, such as a trellis structure, that is to be avoided by the vehicle.

For example, referring to FIGS. 5A, 5B and 22, the planned traveling route TR can include a straight travel section (parallel path) PP in which the work vehicle 100 travels straight, a turn section (turning path) TP in which the work vehicle 100 turns. In a preferred embodiment of the present invention, the controller 180 generates the planned traveling route TR. For example, the controller 180 can be configured or programmed to function as a global planner and a local planner to generate the planned traveling route TR. The global planner generates an initial planned traveling route TR based on desired way points EN1-EN4, EX1-EX4 on the agricultural field map MP1. An example of the global planner includes a Dijkstra global planner, known to one of ordinary skill in the art. The local planner will receive the initial planned traveling route TR generated by the global planner, and if an obstacle is on the initial planned traveling route TR, for example, if an obstacle is detected by the one or more various sensors as the work vehicle 100 travels in the agricultural field, then the local planner will change/update the initial planned traveling route TR so that the work vehicle avoids an obstacle. For example, the local planner is able to use Time Elastic Bands (TEB), known to one of ordinary skill in the art, or the techniques described with respect to FIGS. 12A-12D, 13A, and 13B. In this way, the controller 180 is configured or programmed to determine whether or not to update a planned traveling route TR of a work vehicle based on an obstacle detected by the one or more various sensors.

If a trellis structure has, for example, a vine or branch that is larger than what the map data 1000 indicates from storage such that the vine or branch extends too close or into the global path of the vehicle's travel route, then it is preferable to provide a buffer zone to take into account such difference. An inflation layer is provided as a zone that surrounds the obstacle layer. An inflation layer value (inf), which indicates a distance between the inflation layer and an outermost boundary drawn around an obstacle, can be adjusted in real-time or by user setting to provide the inflation layer which acts as an invisible bubble surrounding obstacles to be avoided within a vehicle's travel path to prevent collisions. By overlaying the inflation layers with the obstacle layers provided by the two-dimensional map data, the local path is generated which provides obstacle avoidance. The inflation layers can be stored in the map data 1000 to be utilized for future travel plans or operations of the autonomous work vehicle.

According to a preferred embodiment, referring to FIG. 3B and FIG. 4A with respect to Judging Point 2, the input data entered at the terminal device 400 from the user includes:

W1 which defines a trellis row width; and

A1 which defines a total width of the work vehicle 100 and the implement 300 attached to the work vehicle 100.

The information detected by the one or more various sensors includes an inflation layer value (Inf), as shown in FIG. 22. According to a preferred embodiment, referring to FIGS. 1A, 3, and 22, the work vehicle 100 is allowed to reverse into the third row R5 of the second lot plot PL2 if A1<[W1−(Inf×2)]. Alternatively, if the trellis row width W1 is unknown or cannot be determined at the time, then width W2 can be used instead of the width W1. In such a case, in an alternative preferred embodiment, under Judging Point 2, the work vehicle 100 is allowed to reverse into the third row R5 of the second lot plot PL2 if A1<[W2−(Inf×2)].

In addition to vineyard applications, the techniques of the present disclosure are applicable to any agricultural machine, such as a tractor, a harvester, a rice trans-planter, a vehicle for crop management, a vegetable transplanter, a mower, a seeder, a spreader, or an agricultural robot, for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An autonomous vehicle navigation system for a work vehicle capable of self-driving, the system comprising:
    a controller configured or programmed to:
        receive information that is regarding a location of the work vehicle or an environment of the work vehicle and is detected by at least one sensor;
        receive input data entered at a terminal device from a user; and
        cause the work vehicle to:
            traverse a first plot including a plurality of rows;
            exit the first plot from a first row included in the plurality of rows of the first plot;
            traverse a margin area located between the first plot and an adjacent area or a second plot, the adjacent area or the second plot being spaced away from the first plot with the margin area located between the first plot and the adjacent area or the second plot; and
            perform a turning maneuver process before entering, in a forward direction of the vehicle, a second row in the plurality of rows of the first plot; wherein
    the second plot includes a third row defined by a space between rows of vegetation; and
    when the work vehicle performs the turning maneuver process, the controller is configured or programmed to allow at least a portion of the work vehicle to reverse, in a rearward direction of the vehicle that is opposite to the forward direction of the vehicle, into the third row based on the controller judging whether or not at least one or more conditions is satisfied, the one or more conditions being based on the data detected from the at least one sensor and/or the input data entered at the terminal device from the user.

2. The autonomous vehicle navigation system according to claim 1, wherein if the controller judges that at least one of the conditions is not satisfied, the controller is configured or programmed to set a geofence between the margin area and the adjacent area or the second plot.

3. The autonomous vehicle navigation system according to claim 1, wherein
    the input data entered at the terminal device from the user includes a user select function being set to ON or OFF; and
    the at least one or more conditions for the work vehicle being allowed to reverse into the third row is based on the user select function.

4. The autonomous vehicle navigation system according to claim 1, wherein
    the input data entered at the terminal device from the user includes an indication of whether or not an implement attached to the work vehicle includes one or more tires; and
    the at least one or more conditions for the work vehicle being allowed to reverse into the third row is based on the indication of whether or not the implement attached to the work vehicle includes one or more tires;
    if the implement includes one or more tires, then the work vehicle is not allowed to reverse into the third row; and
    if the implement does not include one or more tires, then the work vehicle is allowed to reverse into the third row.

5. The autonomous vehicle navigation system according to claim 1, wherein
    the input data entered at the terminal device from the user includes:
        a length (A) of the work vehicle;
        a length (L) of an implement attached to the work vehicle; and
        a width ($W_A$) of the margin area; and
    the at least one or more conditions for the work vehicle being allowed to reverse into the third row is based on A, L, and $W_A$ such that the work vehicle is allowed to reverse into the third row if either one of the following conditions are satisfied: L<A or $W_A$<L+A.

6. The autonomous vehicle navigation system according to claim 1, wherein
    the input data entered at the terminal device from the user includes:
        CL which defines a position of a center line in a front-rear direction of an implement that is attached to the work vehicle when viewed from above;
        TCL which defines a position of a center line of the work vehicle in the front-rear direction when viewed from above; and
    the at least one or more conditions for the work vehicle being allowed to reverse into the third row is based on CL and TCL such that the work vehicle is allowed to reverse into the third row if CL is equal or substantially equal to TCL when viewed from above.

7. The autonomous vehicle navigation system according to claim 1, wherein
the input data entered at the terminal device from the user includes an indication of whether or not a trellis is present in the second plot; and
the work vehicle is allowed to reverse into the third row if the trellis is present in the second plot.

8. The autonomous vehicle navigation system according to claim 1, wherein
the input data entered at the terminal device from the user includes an indication of whether or not the adjacent area is a field; and
the work vehicle is allowed to reverse into the adjacent area if the adjacent area is a field.

9. The autonomous vehicle navigation system according to claim 1, wherein
the input data entered at the terminal device from the user includes:
W1 which defines a trellis row width; and
A1 which defines a total width of the work vehicle and an implement attached to the work vehicle; and
the work vehicle is allowed to reverse into the third row if A1 is less than W1.

10. The autonomous vehicle navigation system according to claim 1, wherein
the adjacent area is an adjacent field;
the input data entered at the terminal device from the user or the information detected by the at least one sensor includes a slope of the second plot or the adjacent field; and
the work vehicle is allowed to reverse into the third row of the second plot or the adjacent field if the slope is less than a preselected value.

11. The autonomous vehicle navigation system according to claim 1, wherein
the adjacent area is an adjacent field;
the input data entered at the terminal device from the user includes an indication of whether or not a work plan is occurring in the second plot or the adjacent field; and
the work vehicle is allowed to reverse into the third row of the second plot or the adjacent field if there is no work plan occurring in the second plot or the adjacent field.

12. The autonomous vehicle navigation system according to claim 1, wherein
the information detected by the at least one sensor includes an indication of a trellis type of a trellis in the second plot being I-type vineyard training or Y-type vineyard training; and
the work vehicle is allowed to reverse into the third row of the second plot if the trellis type is I-type vineyard training; and
the work vehicle is not allowed to reverse into the third row of the second plot if the trellis type is Y-type vineyard training.

13. The autonomous vehicle navigation system according to claim 1, wherein
the information detected by the at least one sensor includes an inflation layer value; and
the work vehicle is allowed to reverse into the third row of the second plot if the inflation layer value is less than or equal to a predetermined value.

14. The autonomous vehicle navigation system according to claim 1, wherein
the input data entered at the terminal device from the user includes:
W1 which defines a trellis row width; and
A1 which defines a total width of the work vehicle and an implement attached to the work vehicle; and
the information detected by the at least one sensor includes an inflation layer value (Inf); and
the work vehicle is allowed to reverse into the third row of the second plot if $A1<W1-(Inf\times 2)$.

15. The autonomous vehicle navigation system according to claim 1, wherein
the controller is configured or programmed to determine:
N1 which is a number of reverses required if the work vehicle performs the turning maneuver process using the adjacent area or the third row; and
N2 which is a number of reverses required when the work vehicle performs the turning maneuver process without using the adjacent area or the third row;
the input data entered at the terminal device from the user includes α which is a number of reverses set by the user; and
the work vehicle is allowed to reverse into the third row of the second plot if $N2 \leq \alpha$ and N2≥1 N1>1 is satisfied.

16. The autonomous vehicle navigation system according to claim 1, wherein
the information detected by the at least one sensor includes:
T1 which is a trellis row direction of a trellis of the second row; and
T2 which is a trellis row direction of a trellis of the third row; and
the work vehicle is allowed to reverse into the third row of the second plot if an angle between T1 and T2 is less than or equal to a predetermined value.

17. The autonomous vehicle navigation system according to claim 1, wherein
the first plot, the margin area, and the second plot are included in a field;
the information detected by the at least one sensor includes a location of the work vehicle with respect to a center of the field and an edge of the field, boundaries between the center of the field and the edges of the field extending along outer edge of outermost rows of the first plot; and
the work vehicle is allowed to reverse into the third row of the second plot if the work vehicle is located in the center of the field.

18. The autonomous vehicle navigation system according to claim 1, wherein
the information detected by the at least one sensor includes an indication of whether or not there is an obstacle detected in the third row; and
the work vehicle is allowed to reverse into the third row if there is no obstacle detected in the third row.

19. A method being performed by a controller of autonomous vehicle navigation for a work vehicle capable of self-driving, the method comprising the steps of:
receiving information that is regarding a location of the work vehicle or an environment of the work vehicle and is detected by at least one sensor;
receiving input data entered at a terminal device from a user; and
causing the work vehicle to:
traverse a first plot including a plurality of rows;
exit the first plot from a first row included in the plurality of rows of the first plot;
traverse a margin area located between the first plot and an adjacent area or a second plot, the adjacent area or the second plot being spaced away from the first plot with the margin area located between the first plot and the adjacent area or the second plot; and perform a turning maneuver process before entering, in a forward direction of the vehicle, a second row in the plurality of rows of the first plot; wherein the second plot includes a third row defined by a space between rows of vegetation; and when the work vehicle performs the turning maneuver process, the controller is configured or programmed to allow at least a portion of the work vehicle to reverse, in a rearward direction of the vehicle that is opposite to the forward direction of the vehicle, into the third row based on the controller judging whether or not at least one or more conditions is satisfied, the one or more conditions being based on the information obtained from the at least one sensor and/or the input data entered at the terminal device from the user.

20. The method according to claim 19, further comprising the step of:

setting a geofence between the margin area and the adjacent area or the second plot if the controller judges that at least one of the conditions of the first condition group or the condition second group is not satisfied.

* * * * *